United States Patent
Ha et al.

(10) Patent No.: US 9,911,996 B2
(45) Date of Patent: Mar. 6, 2018

(54) METHOD AND APPARATUS FOR CONTROLLING FUEL CONCENTRATION OF LIQUID FUEL CELL BY SENSOR-LESS AND VOLTAGE AMPLITUDE-CONTROL BASED FEED-BACK CONTROL, AND LIQUID FUEL CELL APPARATUS USING THE SAME

(71) Applicant: KOREA INSTITUTE OF SCIENCE AND TECHNOLOGY, Seoul (KR)

(72) Inventors: Heung Yong Ha, Seoul (KR); Myunggi An, Seoul (KR); Jinyeon Hwang, Seoul (KR); Asad Mehmood, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 174 days.

(21) Appl. No.: 14/939,970

(22) Filed: Nov. 12, 2015

(65) Prior Publication Data
US 2016/0156049 A1    Jun. 2, 2016

(30) Foreign Application Priority Data
Nov. 27, 2014    (KR) .................. 10-2014-0167425

(51) Int. Cl.
| | | |
|---|---|---|
| *H01M 8/04791* | (2016.01) | |
| *H01M 8/04186* | (2016.01) | |
| *H01M 8/04537* | (2016.01) | |
| *H01M 8/0438* | (2016.01) | |
| *H01M 8/04992* | (2016.01) | |

(Continued)

(52) U.S. Cl.
CPC ..... *H01M 8/04798* (2013.01); *H01M 8/0438* (2013.01); *H01M 8/04186* (2013.01); *H01M 8/04365* (2013.01); *H01M 8/04552* (2013.01); *H01M 8/04582* (2013.01); *H01M 8/04731* (2013.01); *H01M 8/04992* (2013.01); *H01M 8/1009* (2013.01); *H01M 8/04067* (2013.01); *H01M 8/04164* (2013.01); *H01M 8/1011* (2013.01); *Y02E 60/523* (2013.01)

(58) Field of Classification Search
CPC ............... H01M 8/04; H01M 8/04798; H01M 8/04186; H01M 8/04552; H01M 8/04582; H01M 8/0438; H01M 8/04992; H01M 8/04365; H01M 8/04731; H01M 8/1009; H01M 8/1011; H01M 8/04067; H01M 8/04164; Y02E 60/523
See application file for complete search history.

(56) References Cited

U.S. PATENT DOCUMENTS

| | | |
|---|---|---|
| 8,247,122 B2 | 8/2012 | Okamoto |
| 2006/0024537 A1 | 2/2006 | Fujita et al. |

(Continued)

FOREIGN PATENT DOCUMENTS

| | | |
|---|---|---|
| JP | 2006-73486 A | 3/2006 |
| KR | 10-2007-0035856 A | 4/2007 |

(Continued)

*Primary Examiner* — Alexander Usyatinsky
(74) *Attorney, Agent, or Firm* — Goldilocks Zone IP Law

(57) ABSTRACT

Disclosed is an apparatus for controlling a fuel concentration of a liquid fuel cell apparatus by voltage amplitude control-based feed-back control without using a concentration sensor, which saves power consumed by the fuel cell apparatus and lowers a price of the fuel cell apparatus by using the fuel cell in a simple and small design without using a concentration sensor.

14 Claims, 24 Drawing Sheets

(51) Int. Cl.
*H01M 8/1009* (2016.01)
*H01M 8/0432* (2016.01)
*H01M 8/04701* (2016.01)
H01M 8/1011 (2016.01)
H01M 8/04007 (2016.01)
H01M 8/04119 (2016.01)

(56) References Cited

U.S. PATENT DOCUMENTS

2007/0082244 A1 4/2007 Kuriiwa
2007/0218323 A1 9/2007 Sudo et al.
2009/0110968 A1 4/2009 Ulrike et al.
2011/0244351 A1 10/2011 Park et al.
2014/0154599 A1 6/2014 Ha et al.

FOREIGN PATENT DOCUMENTS

| KR | 10-2007-0073716 A | 7/2007 |
| KR | 10-2009-0022521 A | 3/2009 |
| KR | 10-2009-0043966 A | 5/2009 |
| KR | 10-2011-0110715 A | 10/2011 |
| KR | 10-2014-0072805 A | 6/2014 |

# METHOD AND APPARATUS FOR CONTROLLING FUEL CONCENTRATION OF LIQUID FUEL CELL BY SENSOR-LESS AND VOLTAGE AMPLITUDE-CONTROL BASED FEED-BACK CONTROL, AND LIQUID FUEL CELL APPARATUS USING THE SAME

CROSS-REFERENCE TO RELATED APPLICATION

This application claims priority to Korean Patent Application No. 10-2014-0167425, filed on Nov. 27, 2014 and all the benefits accruing therefrom under 35 U.S.C. § 119, the contents of which in its entirety are herein incorporated by reference.

BACKGROUND

1. Field

The present disclosure relates to a system and method for controlling a concentration of a fuel supplied to a liquid fuel cell on the basis of amplitude formed by a fluctuating voltage of a fuel cell stack without using a concentration sensor, and a fuel cell apparatus using the same.

Description About National Support Research and Development

This study was supported by the Ministry of Trade, Industry and Energy, Republic of Korea (Korea Institute of Energy Technology Evaluation and Planning, Project No. 1415132261) under the superintendence of Korea Institute of Science and Technology.

2. Description of the Related Art

One of most serious problems that humankind of the twenty-first century is confronted with is limitation of energy resources and global environmental pollution. As an alternative to solve such a problem, a fuel cell is spotlighted as a next-generation energy source for solving energy exhaustion and environmental problems simultaneously. Fuel cells are greatly classified into a molten carbonate fuel cell (MCFC), a solid oxide fuel cell (SOFC), a polymer electrolyte membrane fuel cell (PEMFC) or the like, depending on kinds and characteristics of electrolyte. Among them, a direct methanol fuel cell (DMFC) is intensively studied as a power source of a small or portable device or as an alternative of a battery since it uses a liquid fuel and is convenient in supplying and storing its fuel.

In a liquid fuel cell having the direct methanol fuel cell, it is important to constantly supply a fuel at an optimal concentration and reuse a non-reacted fuel discharging from a fuel cell stack to enhance performance and energy efficiency of the fuel cell.

In this regard, as a representative fuel concentration control method used in the art, there is a control method using a concentration sensor (for example, a methanol concentration sensor). In this control method, a concentration sensor is used to measure a fuel concentration in a fuel cell circulating system, and an amount of injected crude fuel required for constantly maintaining a fuel concentration is calculated while observing a concentration variation and is supplied to the fuel cell, thereby controlling a concentration of a fuel supplied to the stack.

FIG. 1 is a schematic view showing an existing fuel cell apparatus having a concentration sensor.

As shown in FIG. 1, in the fuel cell system using a concentration sensor, a diluted fuel is supplied from a fuel mixer 1 through a fuel circulating pump 2 to the anode inlet of a fuel cell stack 3.

In addition, in the fuel cell stack 3, air is supplied from an air supply blower 4 to the cathode inlet of the fuel cell stack. The fuel mixer 1 receives a crude fuel from a crude fuel tank 5 through a crude fuel supply pump 6.

The crude fuel supply pump 6 is connected to a concentration controller 9, and the crude fuel supply pump 6 is operated according to a signal generated by the concentration controller 9 of the crude fuel supply pump. In addition, a fuel concentration sensor 17 is connected to the fuel mixer 1, and the diluted fuel stored in the fuel mixer 1 is supplied to the concentration sensor 17 by a sensor pump 16, which supplies a fuel to the concentration sensor, thereby measuring a concentration of the diluted fuel.

However, this method requires a concentration sensor and a pump attached to the sensor and thus has disadvantages of reduced energy efficiency of the fuel cell system caused by increased power consumption and an increased system volume. Further, concentration sensors presently put in the market are expensive and have a great measurement error and short life cycle. Thus, if such concentration sensors are applied to a fuel cell system, a manufacture cost for the fuel cell system increases, and safety of the fuel cell system deteriorates, which makes it difficult to maintain competitiveness in price and quality as a portable or small power source.

In order to solve the above problem, a concentration control method not using a concentration sensor has been developed. For example, there have been developed a method for additionally supplying a crude fuel as much as an amount consumed by a fuel cell (Patent Literature 1), a method for controlling an operation temperature (T) of a fuel cell stack by controlling a supply rate of the crude fuel and a cooling rate of a heat exchanger simultaneously (Patent Literature 2), a method for estimating a concentration of a liquid fuel by arbitrarily varying a fuel cell output current density and monitoring a result variation pattern of an output voltage (Patent Literature 3) or the like.

However, the above concentration control methods not using a sensor have a drawback in that a long time is needed for building a fuel consumption database required for the control method. Also, since the above concentration control methods are focused in simply maintaining a fuel concentration constantly, it is impossible to actively control a fuel concentration according to an external temperature variation. In addition, when an output current density is varied, an operation temperature (T) of the fuel cell stack, an output voltage and a fuel concentration are continuously varied, and when the performance of the fuel cell deteriorates due to a long time use, the output voltage decreases. For these reasons, an error increases in the concentration control.

RELATED LITERATURES

Patent Literature

Korean Unexamined Patent Publication No. 10-2009-0022521
US Unexamined Patent Publication No. 2014/0154599
US Unexamined Patent Publication No. 2009/0110968

SUMMARY

The present disclosure is directed to providing a method and apparatus for controlling a fuel concentration of a liquid fuel cell by voltage amplitude control-based feed-back control without using a concentration sensor, which may save power consumed by a fuel cell apparatus and lower a price of the fuel cell apparatus by using the fuel cell in a simple and small design without using a concentration sensor, and a liquid fuel cell apparatus using the same.

The present disclosure is also directed to providing a method and apparatus for controlling a fuel concentration of a liquid fuel cell by voltage amplitude control-based feed-back control without using a concentration sensor, which may control a concentration of a methanol fuel supplied to a fuel cell stack by feeding back a voltage amplitude, based on the conception that the degree of voltage fluctuation (voltage amplitude) generated during an operation of the fuel cell increases in proportion to a concentration of a diluted fuel supplied to the fuel cell stack, and a liquid fuel cell apparatus using the same.

The present disclosure is also directed to providing a method and apparatus for controlling a fuel concentration of a liquid fuel cell by voltage amplitude control-based feed-back control without using a concentration sensor, which may constantly maintain a concentration of a diluted fuel supplied to a fuel cell stack in a desired level even in a dynamic state when an operating condition or electric load varies due to an external environment, by adjusting a voltage amplitude generated in an operation of the stack, and a liquid fuel cell apparatus using the same.

The present disclosure is also directed to providing a method and apparatus for controlling a fuel concentration of a liquid fuel cell by voltage amplitude control-based feed-back control without using a concentration sensor, which may improve safety and life cycle of a fuel cell stack by minimizing water flooding, which may occur during a long-term operation, and also maximize efficiency of a fuel cell system by minimizing instability of the stack, which may occur due to a variation of external temperature.

In one aspect of the present disclosure, there is provided a method controlling a fuel concentration of a liquid fuel cell by sensor-free voltage amplitude control-based feed-back control, which includes: a first step of measuring an output voltage amplitude ($V_{amp}$) and a stack operation temperature (T) according to a variation of a diluted fuel concentration under an operating condition of the liquid fuel cell and establishing a correlation between the diluted fuel concentration and the voltage amplitude ($V_{amp}$); a second step of setting an actual operating condition including target voltage amplitude ($V_{st\text{-}amp}$) and a target stack temperature ($T_{st}$) of the fuel cell stack based on the correlation between the diluted fuel concentration and the voltage amplitude ($V_{amp}$); and a third step of operating a fuel cell based on the actual operating condition, measuring voltage amplitude ($V_{amp}$) where an output voltage ($V_i$) of the fuel cell fluctuates according to a voltage amplitude measurement period ($t_{st}$), determining a supply rate ($P_{fuel}$) of a crude fuel so that the measured voltage amplitude ($V_{amp}$) reaches the target voltage amplitude ($V_{st\text{-}amp}$), and supplying the crude fuel to a fuel mixer.

In an embodiment, the actual operating condition may further include an output current ($I_{st}$).

In an embodiment, the third step may start operating since the fuel cell reaches a target operating condition after passing a start-up period or enters a normal state after reaching the target operation condition, and when the third step starts operating, a crude fuel supply rate ($P_{fuel}$) at an initial stage may be identical to a crude fuel supply rate ($P_{fuel}$) at a final stage of the start-up period.

In an embodiment, the crude fuel supply rate ($P_{fuel}$) may be determined by multiplying a value calculated by using an output current ($I_{st}$) according to the operation of the liquid fuel cell and a Faraday constant by a predetermined number, and the number may be determined by using any one of P, PI and PID solely or using P, PI and PID alternately.

In an embodiment, the voltage amplitude ($V_{amp}$) may be calculated from a difference between a maximum voltage ($V_{max}$) and a minimum voltage ($V_{min}$) measured during the voltage amplitude measurement period ($t_{st}$), or calculated by a difference between average values of first and second groups, which are classified so that the first group includes values greater than an average value of all voltage values in the voltage amplitude measurement period ($t_{st}$) and the second group includes values smaller than the average value of the all voltage values, the voltage amplitude measurement period ($t_{st}$) may be 1 to 30 seconds, and when the measured voltage amplitude ($V_{amp}$) is greater than the target voltage amplitude ($V_{st\text{-}amp}$), the supply rate ($P_{fuel}$) of the crude fuel may be decreased, and when the measured voltage amplitude ($V_{amp}$) is smaller than the target voltage amplitude ($V_{st\text{-}amp}$), the supply rate ($P_{fuel}$) of the crude fuel may be increased.

In an embodiment, in the third step, the process of controlling the supply rate ($P_{fuel}$) of the crude fuel based on the voltage amplitude ($V_{amp}$) may be performed by a feed-back controller based on the voltage amplitude ($V_{amp}$), and the feed-back controller may be implemented by using any one of P, PI and PID solely or using P, PI and PID alternately.

In an embodiment, the method for controlling a fuel concentration by sensor-free control may include an auto-tuning process for varying a target voltage amplitude ($V_{st\text{-}amp}$) according to an operation temperature (T) of the fuel cell stack; when the operation temperature (T) of the fuel cell stack is higher than a maximum temperature ($T_{max}$) of an error range of the target operation temperature ($T_{st}$), the target voltage amplitude ($V_{st\text{-}amp}$) may be lowered; when the operation temperature (T) of the fuel cell stack is lower than a minimum temperature ($T_{min}$) of the error range of the target operation temperature ($T_{st}$), the target voltage amplitude ($V_{st\text{-}amp}$) may be raised; and a ratio of varying the target voltage amplitude ($V_{st\text{-}amp}$) may be 1 to 30% of the voltage amplitude ($V_{st\text{-}amp}$).

In an embodiment, a maximum temperature ($T_{max}$) and a minimum temperature ($T_{min}$) of the fuel cell stack may be respectively calculated according to Equation 1 below, and an allowable error range ($e_T$) of the stack temperature may be 0.01 to 0.05.

$$T_{max}=T_{st}*(1+e_T)$$

$$T_{min}=T_{st}*(1-ee_T) \quad \text{Equation 1}$$

In Equation 1, $T_{max}$ represents a maximum value of the stack temperature, $T_{st}$ represents a target temperature of the fuel cell stack, $e_T$ represents an allowable error range of the stack temperature, and $T_{min}$ represents a minimum value of the stack temperature. The allowable error of the fuel cell stack temperature may be arbitrarily or automatically changed while the fuel cell system is operating to improve the performance.

In an embodiment, a voltage amplitude ($V_{amp}$) measured for the first time in the third step may be set as the target voltage amplitude ($V_{st\text{-}amp}$), and the voltage amplitude ($V_{amp}$) may be adjusted by performing the auto-tuning process so that the target voltage amplitude ($V_{st\text{-}amp}$) is automatically determined without establishing a correlation between the voltage amplitude ($V_{amp}$) and the diluted fuel concentration.

In an embodiment, when the fuel cell is operated, the operation of the fuel cell may be stopped in case an average output voltage of unit cells of the fuel cell stack is lower than 0.1 to 0.2V, in case any one of the unit cells has a voltage ($V_i$) equal to or lower than 0.0 to 0.1V, or in case any one of the unit cells has an operation temperature (T) higher than 90 to 100° C.

In an embodiment, a fuel used in the fuel cell may be any one reactant selected from the group consisting of methanol, ethanol, formic acid, isopropanol, normal propanol, ethylene glycol, dimethyl ether, butanol, hydrogen, butane, ethane, propane, boron compounds or boron hydrides, carbon dioxide, water, bio materials, and their mixtures.

In another aspect of the present disclosure, there is provided an apparatus for controlling a fuel concentration of a liquid fuel cell by sensor-free voltage amplitude control-based feed-back control, which is connected to a measuring device for measuring an output current and an output voltage of the liquid fuel cell and a temperature and a pressure in a fuel cell stack, the apparatus including: a first processing unit configured to measure an output voltage amplitude ($V_{amp}$) and a stack temperature (T) according to an operating condition of the liquid fuel cell and build a database of the voltage amplitude ($V_{amp}$) and a consumption rate of a diluted fuel under the operating condition; a second processing unit configured to set a target voltage amplitude ($V_{st-amp}$) and a target stack temperature ($T_{st}$) based on a correlation between the consumption rate of the diluted fuel and the voltage amplitude ($V_{amp}$); and a third processing unit configured to measure a voltage amplitude ($V_{amp}$) and a temperature (T) of the fuel cell stack at a voltage amplitude measurement period ($t_{st}$), compare the voltage amplitude ($V_{amp}$) and the temperature (T) of the fuel cell stack respectively with the target voltage amplitude ($V_{st-amp}$) and the target stack temperature ($T_{st}$) to calculate a deviation or an error, determine a signal of a supply rate ($P_{fuel}$) of a crude fuel according to a feed-back control so that the measured voltage amplitude ($V_{amp}$) reaches the target voltage amplitude ($V_{st-amp}$), and send the signal to a fuel supply unit, wherein the auto-tuning unit is operated as a substitution for operating the first processing unit.

In an embodiment, the apparatus for controlling a fuel concentration by sensor-free control may include an auto-tuning unit configured to vary a target voltage amplitude ($V_{st-amp}$) according to an operation temperature (T) of the fuel cell stack; in the voltage amplitude measurement period ($t_{st}$), the operation temperature (T) of the fuel cell stack may be measured and compared respectively with the target voltage amplitude ($V_{st-amp}$) and the target stack temperature ($T_{st}$) to calculate an error or a deviation; when the operation temperature (T) of the fuel cell stack is higher than a maximum temperature ($T_{max}$) of an error range of the target operation temperature ($T_{st}$), the target voltage amplitude ($V_{st-amp}$) may be lowered; when the operation temperature (T) of the fuel cell stack is lower than a minimum temperature ($T_{min}$) of the error range of the target operation temperature ($T_{st}$), the target voltage amplitude ($V_{st-amp}$) may be raised; and a ratio of varying the target voltage amplitude ($V_{st-amp}$) may be 1 to 30% of the voltage amplitude ($V_{st-amp}$).

In an embodiment, a voltage amplitude ($V_{amp}$) measured for the first time when the liquid fuel cell reaches a target operating condition after passing a start-up period or enters a normal state after reaching the target operating condition may be used as the target voltage amplitude ($V_{st-amp}$), as a substitution for operating the first processing unit.

In another aspect of the present disclosure, there is provided a liquid fuel cell apparatus, which includes: a fuel cell stack; a heat exchange unit connected to the fuel cell stack; a fuel supply unit configured to supply a diluted fuel to the fuel cell stack; a temperature measuring device of the fuel cell stack; an output measuring device configured to measure at least one of output voltage and current of the fuel cell stack; and the control apparatus described above, wherein the heat exchange unit includes a heat exchanger connected to the fuel cell stack and a heat removal degree control part configured to control a heat removal degree of the heat exchanger, wherein the fuel supply unit includes a fuel mixer configured to supply a diluted fuel to the fuel cell stack and a crude fuel supply part configured to supply a crude fuel to the fuel mixer, and wherein the control apparatus is connected to the temperature measuring device, the heat removal degree control part, the crude fuel supply part and the output measuring device.

In an embodiment, the fuel supply unit may include: a fuel mixer; a crude fuel tank connected to the fuel mixer; and a pump serving as the crude fuel supply part for supplying a crude fuel from the crude fuel tank to the fuel mixer, the control apparatus being connected to the pump, and the heat exchange unit may include: an anode heat exchanger connected to an anode outlet of the fuel cell stack to receive a non-reacted mixture solution and supply a mixture solution with a lowered temperature by heat exchange to the fuel mixer; a cathode heat exchanger connected to a cathode outlet of the fuel cell stack to receive a humidified mixture gas and supply water condensed by heat exchange to a water storage; and a blower serving as the heat removal degree control part connected to the heat exchanger, the control apparatus being connected to the blower.

In an embodiment, a liquid fuel used in the liquid fuel cell may be any one reactant selected from the group consisting of methanol, ethanol, formic acid, isopropanol, normal propanol, ethylene glycol, dimethyl ether, butanol, hydrogen, butane, ethane, propane, boron compounds or boron hydrides, carbon dioxide, water, bio materials, and their mixtures.

According to embodiments of the present disclosure, since a sensor-less type is basically used, which does not use a concentration sensor, a fuel cell apparatus may be prepared with a simple and small design, which may save power consumed for operating the apparatus and lower a price of the apparatus.

According to embodiments of the present disclosure, since a simple operation principle is used in comparison to existing concentration controllers not using a concentration sensor, it is possible to shorten manufacture cost and time of a controller, allow fast and accurate concentration control, and ensure stable operation of the fuel cell system for a long time.

According to embodiments of the present disclosure, a supply rate of a crude fuel may be controlled to enhance performance of the fuel cell.

According to embodiments of the present disclosure, if a voltage amplitude increases as water flooding increases at a cathode due to a long-term operation of the fuel cell, a controller based on voltage amplitude feed-back control may actively lower a concentration of the diluted fuel, thereby normally maintaining performance of the stack.

According to embodiments of the present disclosure, since a voltage amplitude is controlled even though an external temperature varies, a concentration of the fuel may be controlled, and accordingly the variation of the external temperature may be actively handled, thereby ensuring optimal operation of the fuel cell.

BRIEF DESCRIPTION OF THE DRAWINGS

FIG. 7A depicts raw data for a variation of the output voltage according to time, FIG. 7B is a graph prepared by obtaining maximum voltages and minimum voltages at intervals of 10 seconds and then connecting them, and FIG. 7C depicts voltage amplitudes according to time, where a small graph of FIG. 7C shows a relation of voltage amplitude according to a methanol concentration, prepared by recombining data of the great graph.

FIG. 8A is a graph showing a voltage obtained when a fuel cell stack is operated while setting a target value of voltage amplitude to be 0.05V, and FIG. 8B is a graph showing a concentration of the diluted fuel at this time.

FIG. 9A is a graph showing a concentration control result according to an operation time when a concentration of diluted fuel is controlled using a sensor, and FIG. 9B is a graph showing a concentration control result according to an operation time when a concentration of diluted fuel is controlled without using a sensor. FIG. 9C is a graph comparatively showing variations of the output voltage according to each operation time.

FIG. 10A is a graph showing a variation of external temperature according to time, FIG. 10B is a graph showing a variation of stack temperature according to external temperature, FIG. 10C is a graph showing a variation of a concentration of diluted fuel according to external temperature, and FIG. 10D is a graph showing a variation of voltage and power according to a variation of external temperature.

FIG. 11A is a graph showing a variation of external temperature according to time, FIG. 11B is a graph showing a variation of stack temperature according to a variation of external temperature, FIG. 11C is a graph showing a variation of a concentration of diluted fuel according to a variation of external temperature, and FIG. 11D is a graph showing a variation of voltage and power according to a variation of external temperature.

DETAILED DESCRIPTION

In this specification, the term 'recirculation of fuel' means that a non-reacted fuel emitting from a fuel cell stack is not discharged out but is returned to the fuel mixer, and a high-concentration crude fuel is supplemented to the fuel mixer to prepare a diluted fuel (a reacting solution containing a fuel) with an optimal concentration, and then the concentration-adjusted diluted fuel is supplied to the fuel cell stack and used again.

In this specification, the term 'crude fuel' means a high-concentration fuel stored in a fuel storage, and a crude liquid of the fuel may include not only a crude liquid of 100% fuel concentration but also a high-concentration crude fuel, for example a crude fuel having a concentration of 10 wt % or above, preferably 40 wt % or above.

In this specification, the term 'diluted fuel' means a fuel supplied to a fuel cell stack after its concentration is adjusted to a predetermined value at the fuel mixer, and the diluted fuel has a low concentration in comparison to the crude fuel.

In this specification, the term 'target concentration' or 'target concentration value' means a predetermined target concentration when a fuel concentration of a diluted fuel supplied to a stack is adjusted to the predetermined value.

In this specification, the term 'operating condition' means an operating condition of a fuel cell, which may include, for example, at least one condition selected from a concentration of a fuel supplied to the fuel cell stack, a flow rate or flux of a fuel, operation temperature of the fuel cell stack, an output current of a fuel cell, and an output voltage of the fuel cell.

In this specification, the term 'start-up operation' means an operation state when a current does not yet reach a target output current or temperature does not reach an error range set from target temperature of the fuel cell stack after the fuel cell stack starts operation.

In this specification, the term 'voltage amplitude' means the degree of voltage fluctuation generated during an operation of the stack.

In this specification, the term 'stack' means a fuel cell unit cell or a stack made of multiple unit cells.

Hereinafter, embodiments of the present disclosure will be described in detail.

The present disclosure is directed to a method for controlling a fuel concentration of a liquid fuel cell by voltage amplitude control-based feed-back control without using a concentration sensor, which may control a supply rate of crude fuel by using voltage amplitude representing the degree of voltage fluctuation generated in an operation of a fuel cell stack.

First, the influence of the rate on voltage amplitude by a liquid fuel will be described.

Figure 2A:
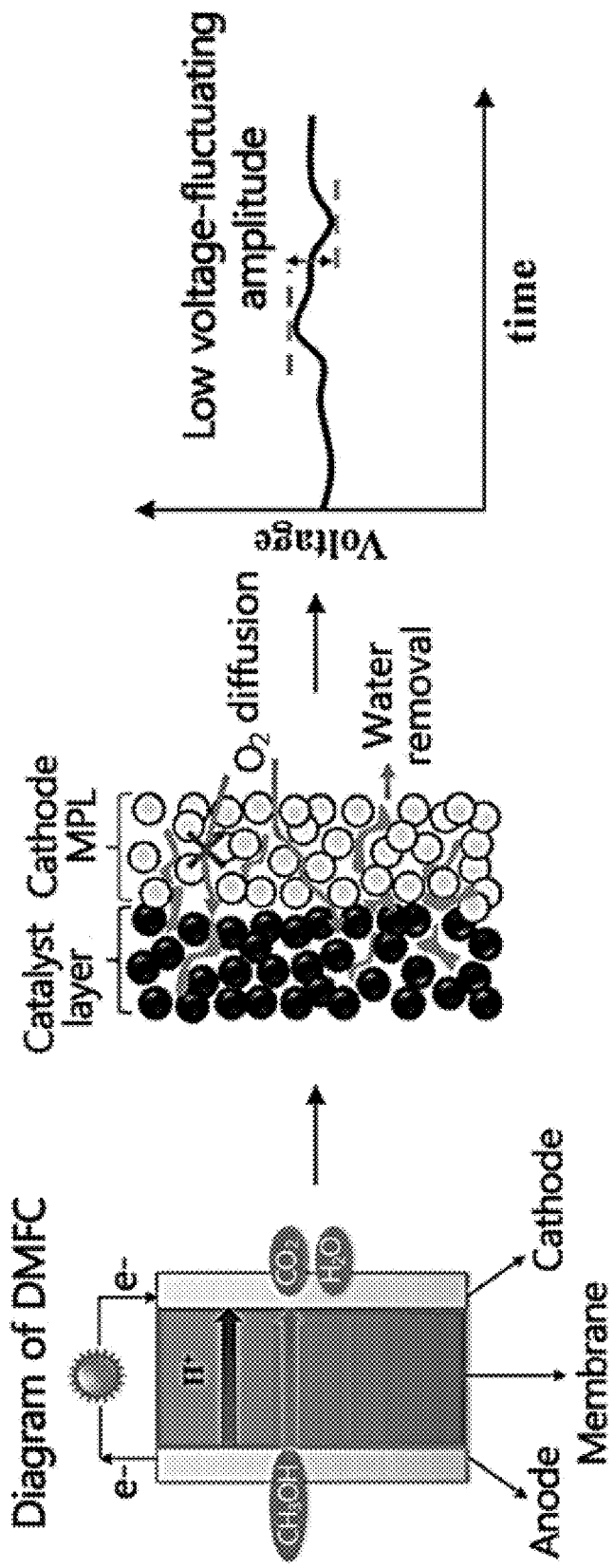
FIGS. 2A and 2B are diagrams for illustrating an influence on voltage amplitude by a rate (fuel permeability) of a liquid fuel passing from an anode to a cathode through an electrolyte membrane. For reference, explanation recited in the diagrams of FIGS. 2A and 2B is just for better understanding, and the present disclosure should not be interpreted as being limited thereto.
Figure 2B:
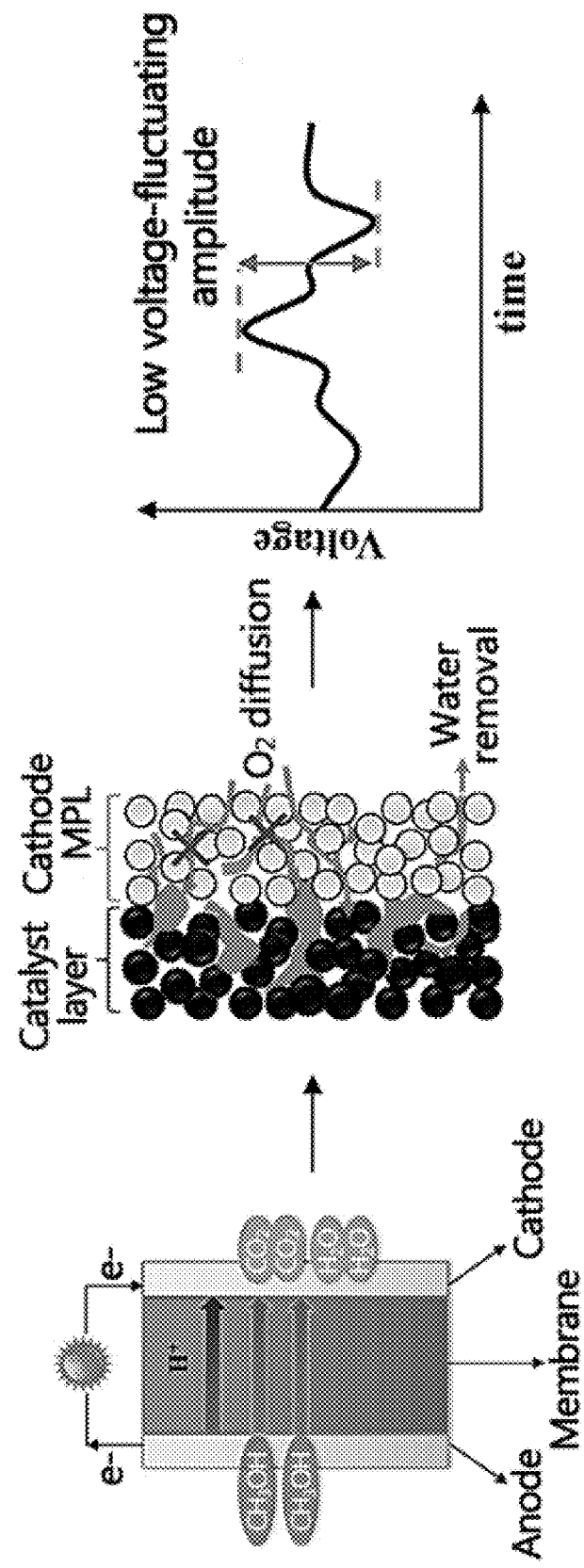

FIGS. 2A and 2B are diagrams for illustrating an influence on voltage amplitude by a rate (fuel permeability) of a liquid fuel passing from an anode to a cathode through an electrolyte membrane.

FIG. 2A is a diagram showing the water generated at a cathode catalyst layer and a resultant variation of voltage amplitude, when methanol permeability is low. As methanol permeability is lower, the rate of water generated at the cathode catalyst layer is smaller. In this case, oxygen may be easily supplied to the catalyst layer, and thus output voltage amplitude of the fuel cell becomes smaller.

Meanwhile, FIG. 2B is a diagram showing of the water generated at the cathode catalyst layer and a resultant variation of voltage amplitude, when methanol permeability is high. If methanol permeability is high, the rate of water generated at the cathode catalyst layer increases and is accumulated at the catalyst layer, which disturbs oxygen not to approach the catalyst layer. If this state is continued, cathode reaction rate becomes instable, and thus the voltage amplitude increases.

Therefore, it could be found that the degree of voltage fluctuation generated during the operation of the stack, namely voltage amplitude, is proportional to the rate of fuel moving from the anode to the cathode through the electrolyte membrane, the rate of fuel passing through the electrolyte membrane is proportional to a concentration of diluted fuel supplied from the fuel mixer to the stack. Accordingly, the apparatus for controlling a fuel concentration of a liquid fuel cell by voltage amplitude control-based feed-back control without using a concentration sensor (hereinafter, referred to as a "sensor-less control apparatus") according to an embodiment of the present disclosure may adjust a concentration of diluted fuel to a suitable level by adjusting a supply rate of crude fuel supplied to the fuel mixer so that the voltage amplitude of the stack is maintained to a suitable level.

Hereinafter, a method for calculating voltage amplitude will be described in detail.

Voltage Amplitude Calculating Method

Figure 3:
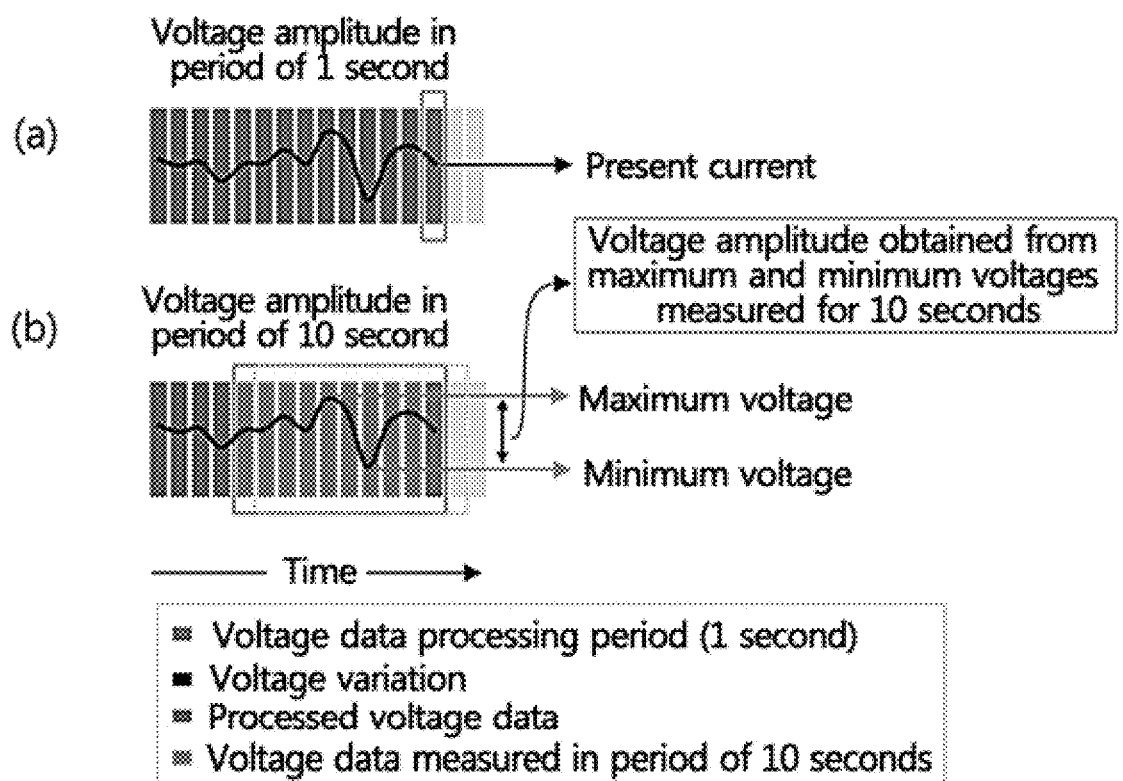
FIG. 3 is a diagram for illustrating a voltage amplitude calculating method according to an embodiment of the present disclosure. For reference, explanation recited in the diagram of FIG. 3 is just for better understanding, and the present disclosure should not be interpreted as being limited thereto.

FIG. 3 is a diagram for illustrating a voltage amplitude calculating method according to an embodiment of the present disclosure. For reference, explanation recited in the diagram of FIG. 3 is just for better understanding, and the present disclosure should not be interpreted as being limited thereto.

Voltage amplitude ($V_{amp}$) may be obtained by observing a variation of voltage according to voltage values measured during a voltage amplitude measurement period ($t_{st}$) and calculating a difference between a maximum voltage and a minimum voltage during the voltage amplitude measurement period ($t_{st}$).

FIG. 3 shows an example of measuring voltage ($V_i$) at intervals of 1 seconds, which is a voltage measurement cycle, in the voltage amplitude measurement period ($t_{st}$) and determining a maximum voltage ($V_{max}$) and a minimum voltage ($V_{min}$) therefrom. In an embodiment, the voltage measurement cycle may be smaller than 1 second. In FIG. 3, the voltage amplitude measurement period ($t_{st}$) is set to be 10 seconds as an example, but this is just an example and the present disclosure is not limited thereto.

The voltage amplitude calculating method using the voltage amplitude measurement period ($t_{st}$) depicted in FIG. 3 may employ any one of two methods as follows.

In a first method, a voltage is measured every second, and if the measurement period is 10 seconds at this time, a maximum and a minimum voltage are collected over the 10 seconds and their discrepancy is calculated as a voltage amplitude ($V_{amp}$) of the period ($t_{st}$). After that, a fuel supply rate is determined using the calculated voltage amplitude ($V_{amp}$). Also, during 10 seconds in a next period, namely in a period of $11^{th}$ to $20^{th}$ seconds, new voltage amplitude is calculated using voltages measured in this period. In addition, in the later period (for $11^{th}$ to $20^{th}$ seconds), a fuel may be supplied using the fuel supply rate calculated in the former 10 seconds period. By doing so, voltage amplitude is calculated at every 10 seconds, and in each period, a fuel is supplied with the fuel supply rate calculated using the voltage amplitude measured in the former period to control a concentration of the fuel. In other words, the fuel supply rate is maintained constantly during every 10 seconds, which is a voltage amplitude measurement period.

In a second method, during first 10 seconds, voltage amplitude is calculated by measuring voltages for a period of $1^{st}$ to $10^{th}$ seconds as mentioned previously, and at a point of $11^{th}$ seconds, voltage amplitude is calculated by using voltages measured during former 10 seconds, namely from $2^{nd}$ to $11^{th}$ second, in this time. Also, 1 second later, namely at a point of $12^{th}$ second, voltage amplitude is calculated by using voltages measured during $3^{rd}$ to $12^{th}$ seconds. In this case, voltage amplitude is newly calculated at every second, and the crude fuel supply rate is determined by using the calculated voltage amplitude.

In an embodiment, the voltage measurement cycle may be set between about 0.1 second to 2 seconds, more preferably about 1 second.

In an embodiment, the voltage amplitude measurement period ($t_{st}$) may be in the range of about 1 to 30 seconds.

Hereinafter, another method for calculating voltage amplitude ($V_{amp}$) will be described in detail.

In an embodiment, the voltage amplitude ($V_{amp}$) may be calculated by obtaining an average value of voltages during each voltage amplitude measurement period ($t_{st}$), then classifying voltages greater than the average value into a first group, classifying voltages smaller than the average value into a second group, then obtaining an average value of each of the first and second groups, and calculating a difference between the average values.

Different from the above, it is also possible to exclude a maximum value and a minimum value from the voltage amplitude measurement period ($t_{st}$), and then calculate the voltage amplitude ($V_{amp}$) by using any one of the two methods above.

Hereinafter, a method for controlling a fuel concentration by using a voltage amplitude control-based feed-back controller, employed in the control apparatus according to an embodiment of the present disclosure, based on the influence on voltage amplitude by the supply rate of liquid fuel and the voltage amplitude calculating method will be described.

Figure 4:
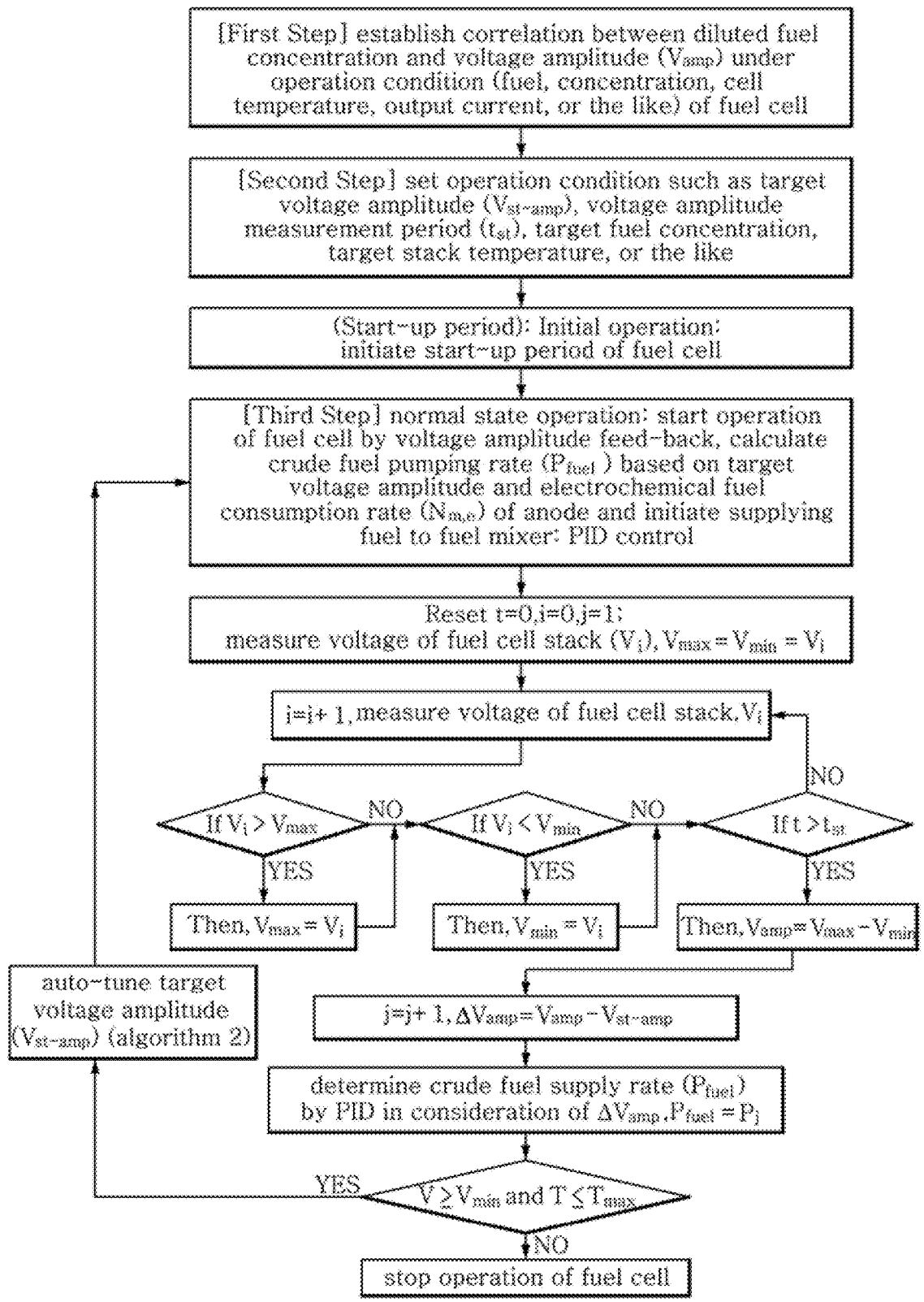
FIG. 4 is a flowchart for illustrating a method for controlling a concentration of a diluted fuel by using a voltage amplitude control-based feed-back controller, employed in the control apparatus according to an embodiment of the present disclosure. For reference, explanation recited in the algorithm of FIG. 4 is just for better understanding, and the present disclosure should not be interpreted as being limited thereto.

FIG. 4 is a flowchart for illustrating a method for controlling a concentration of a diluted fuel by using a voltage amplitude control-based feed-back controller, employed in the control apparatus according to an embodiment of the present disclosure. For reference, explanation recited in the algorithm of FIG. 4 is just for better understanding, and the present disclosure should not be interpreted as being limited thereto.

FIG. 4 shows an algorithm 1, and the algorithm 1 may include first to three steps of a fuel concentration control method according to embodiments of the present disclosure.

Referring to FIG. 4, in embodiments of the present disclosure, there is provided a method for controlling a fuel concentration of a liquid fuel cell by voltage amplitude control-based feed-back control without using a concentration sensor, which includes: a first step of establishing a correlation between a concentration of a diluted fuel and output voltage amplitude ($V_{amp}$) of a fuel cell stack under an operating condition (namely, a crude fuel concentration, a flow rate or flux of the fuel, temperature of the fuel cell stack, or the like) of a liquid fuel cell; a second step of setting an operating condition of the fuel cell stack such as target voltage amplitude ($V_{st-amp}$), a voltage amplitude measurement period ($t_{st}$), operation temperature ($T_{st}$) of the fuel cell stack, an output current ($I_{st}$), or the like based on the correlation established in the first step; and a third step of operating a fuel cell based on the operating condition while calculating a difference between the target voltage amplitude ($V_{st-amp}$) and a present voltage amplitude ($V_{amp}$) during the voltage amplitude measurement period ($t_{st}$) and determining a supply rate ($P_{fuel}$) of the crude fuel so that the voltage amplitude ($V_{amp}$) reaches the target voltage amplitude ($V_{st-amp}$).

Hereinafter, the first to third steps will be described in detail.

In the first step, a correlation between a concentration of the diluted fuel and output voltage amplitude ($V_{amp}$) of the fuel cell stack while the liquid fuel cell is in operation is established.

In detail, when an operation state of the stack reaches a target operating condition and the stack is in an operating condition of a first normal state (a steady state) where an output current is constant, a correlation among the concentration of the diluted fuel, the voltage amplitude ($V_{amp}$) and the stack temperature ($T_{st}$) may be obtained by operating a fuel cell stack while varying a concentration of the diluted fuel, and measuring stack voltage amplitude ($V_{amp}$) and stack temperature ($T_{st}$).

In an embodiment, in the first step, the output current for operation in a first normal state may be set in the range of 10 mA/cm² to 500 mA/cm².

Next, the second step is executed.

The second step is executed after the first step. In the second step, actual operating conditions required for operating the fuel cell such as target voltage amplitude ($V_{st-amp}$), voltage amplitude measurement period ($t_{st}$), target output current ($I_{st}$), or the like are set from the correlation between the concentration of the diluted fuel and the voltage amplitude ($V_{amp}$), established in the first step.

In an embodiment, the first and second steps may be respectively performed in advance before the fuel cell is operated.

Therefore, the target voltage amplitude ($V_{st-amp}$), the voltage amplitude measurement period ($t_{st}$), the target output current ($I_{st}$), the target fuel concentration ($P_{st-fuel}$), the target stack temperature ($T_{st}$), or the like may be set in the second step, namely before the fuel cell is operated.

After that, a start-up operation of the fuel cell is performed. In other words, in a stop, the fuel cell is turned on to perform a start-up operation step (start-up period).

After that, the third step is initiated when the fuel cell reaches a second normal state.

In an embodiment, the second normal state of the fuel cell represents a state where an operating condition of the fuel cell reaches a preset target operating condition, and this means that an output current of the fuel cell stack reaches a preset target output current ($I_{st}$) and also the operating temperature (T) of the fuel cell stack reaches a target error range (namely, $T_{min}<T<T_{max}$) and maintains this state for 1 to 10 minutes or longer.

In the third step, the fuel cell is operated by feeding back the voltage amplitude ($V_{amp}$), and a supply rate ($P_{fuel}$) of the crude fuel is calculated through a PID control unit based on the target voltage amplitude ($V_{st-amp}$) and an electrochemical fuel consumption at the anode and supplied to a fuel mixer.

In detail, in the third step, voltage amplitude ($V_{amp}$) represented by fluctuation of an output voltage (V) of the fuel cell is measured according to the voltage amplitude measurement period ($t_{st}$), and a supply rate ($P_{fuel}$) of the crude fuel supplied to the fuel mixer is determined by means of PID control so that the measured voltage amplitude ($V_{amp}$) reaches the target voltage amplitude ($V_{st-amp}$).

In an embodiment, in the third step, an initial supply rate of the crude fuel supplied to the fuel mixer when the operation is initiated may be set to be identical to a fuel supply rate determined at a last stage of the start-up period. Thus, if there is a start-up period, the third stage of the algorithm 1 may be initiated while injecting the crude fuel to the fuel mixer with the supply rate of the last stage of the start-up period.

Different from the above, in the third stage, the initial supply rate of the crude fuel supplied to the fuel mixer when the operation is initiated may be determined from a current generating reaction occurring at the anode under a given operating condition, namely a fuel consumption rate ($N_{f,e}$) by electrochemical oxidation reaction of methanol.

In an embodiment, the fuel consumption rate ($N_{f,e}$) when a current is generated depends only on the magnitude of the output current and has no relation with other operating conditions. This may be expressed as Equation 1 below.

$$N_{f,e}=f(I)=I/6F \qquad \text{Equation 1}$$

[$N_{f,e}$: fuel consumption rate when a current is generated, I: output current, F: Faraday constant]

The third step may be performed by initiating the supply of fuel to the fuel mixer according to the calculated supply rate of the crude fuel.

After that, as shown in the algorithm 1, feed-back control may be performed according to a difference between preset target voltage amplitude ($V_{st-amp}$) of the given measurement period ($t_{st}$) and presently measured voltage amplitude ($V_{amp}$) to determine a supply rate ($P_{fuel}$) of the crude fuel, thereby controlling a concentration of the diluted fuel.

In detail, seeing procedures after the third step of the algorithm 1, a process of determining voltage amplitude ($V_{amp}$) is depicted, and here the subscript number i value in the voltage ($V_i$) of the fuel cell stack increases in order from 1 to 10 by 1. Among the voltages ($V_i$), a maximum value is stored as a maximum voltage ($V_{max}$) (namely, $V_{max}=V_i$), and a minimum value is stored as a minimum voltage ($V_{min}$) (namely, $V_{min}=V_i$). If measurement time (t) exceeds a given measurement period ($t_{st}$), voltage amplitude ($V_{amp}=V_{max}-V_{min}$) is calculated. After that, in the voltage ($V_i$), the i value is reset to 1.

In an embodiment, the calculated voltage amplitude ($V_{amp}$) is used for calculating an error (e(t)). An error is obtained by comparing target voltage amplitude ($V_{st-amp}$) with the calculated voltage amplitude ($V_{amp}$), as expressed by Equation 2 below.

$$e(t) = \Delta V_{amp} = V_{st-amp} - V_{amp} \quad \text{Equation 2}$$

[e(t): voltage amplitude error, $V_{st-amp}$: target voltage amplitude, $V_{amp}$: present voltage amplitude]

In an embodiment, the voltage amplitude error (e(t)) may be used for calculating an output rate of feed-back control.

In an embodiment, in the third step, feed-back control may be any one of P (Proportional), PI (Proportional Integral) and PID (Proportional Integral Derivative) solely, or P, PI and PID alternately. In an embodiment of the present disclosure, PID feed-back control may be used. At this time, the error (e(t)) is a value used in all of proportional (P), integral (I), and differential (D) terms, and standard PID feed-back control may be configured to calculate a control value by adding three terms, as shown in Equation 3 below.

$$p_j = K_p e(t) + K_i \int_0^t e(t) dt + K_d \frac{d}{dt} e(t) \quad \text{Equation 3}$$

[$p_j$: output quantity calculated by a controller, $K_p$: proportional constant, e(t): error, $K_i$: integral constant, $K_d$: differential constant]

As described above, an output quantity of the PID feed-back control is calculated as a sum of a proportional value of an error value, an integral value of an error value and a derivative value of an error value.

In an embodiment, the PID output quantity ($p_j$) may be used for calculating an actual supply rate ($P_{fuel}$) of the crude fuel together with the fuel consumption rate ($N_{f,e}$) when current is generated. This may be expressed as Equation 4 below.

$$P_{fuel} = N_{f,e}(1+p_j) \quad \text{Equation 4}$$

[$P_{fuel}$: actual crude fuel supply rate, $N_{f,e}$: fuel consumption rate when current is generated, $p_j$: output quantity calculated by the PID controller]

The actual crude fuel supply rate ($P_{fuel}$) represents an actual supply rate of the crude fuel supplied to the fuel mixer by a crude fuel pump. In an embodiment, if the actual crude fuel supply rate ($P_{fuel}$) is calculated, the feed-back controller converts the actual crude fuel supply rate ($P_{fuel}$) into an electric signal and provides to the crude fuel pump, and the crude fuel pump may supply a crude fuel to the fuel mixer at a rate corresponding to the signal.

As described above, the crude fuel actual supply rate ($P_{fuel}$) may be controlled according to the voltage amplitude ($V_{amp}$).

In detail, in the third step, if the measured voltage amplitude ($V_{amp}$) is greater than the target voltage amplitude ($V_{st-amp}$), the error (e(t)) has a negative value, and thus the crude fuel supply rate ($P_{fuel}$) may be decreased. Also, if the measured voltage amplitude ($V_{amp}$) is smaller than the target voltage amplitude ($V_{st-amp}$), the error (e(t)) has a positive value, and thus the crude fuel supply rate ($P_{fuel}$) may be increased.

After that, voltage and temperature of the stack are measured and compared with preset stack voltage and temperature limits. In other words, if the measured voltage ($V_i$) is smaller than the preset voltage minimum value ($V_{min}$) or the stack operating temperature (T) is greater than the preset maximum temperature ($T_{max}$), the operation of the fuel cell stack is stopped. If the voltage ($V_i$) and the stack temperature (T) are within the limits, the fuel cell stack comes to a normal operation.

In an embodiment, when the fuel cell is in operation, the operation of the fuel cell may be stopped if an average output voltage of unit cells of the fuel cell stack is lower than 0.1 to 0.2V, if a voltage ($V_i$) of any one of the unit cells is lower than 0.0 to 0.1V, or if an operation temperature (T) of the fuel cell stack is higher than 90 to 100° C.

In an embodiment, since the voltage of the fuel cell may temporarily lower below the minimum value and also the operation temperature of the fuel cell stack may temporarily rise above the maximum value, the operation is stopped only when the measured values exceed the limits at least three to five times successively or when the measured values exceed the limits at least three to five times among ten successive measurements. Here, the limits serving as a criterion for stopping the operation and an allowable number exceeding the limits may vary depending on the kind of the fuel cell system.

In an embodiment, when the algorithm 1 of FIG. 4 is performed, the target voltage amplitude ($V_{st\_amp}$) is determined from a correlation between the predetermined concentration of the diluted fuel and the voltage amplitude ($V_{amp}$). However, even though such a correlation is not established, the target voltage amplitude ($V_{st-amp}$) may also be determined in situ while operating the fuel cell stack.

Figure 5:
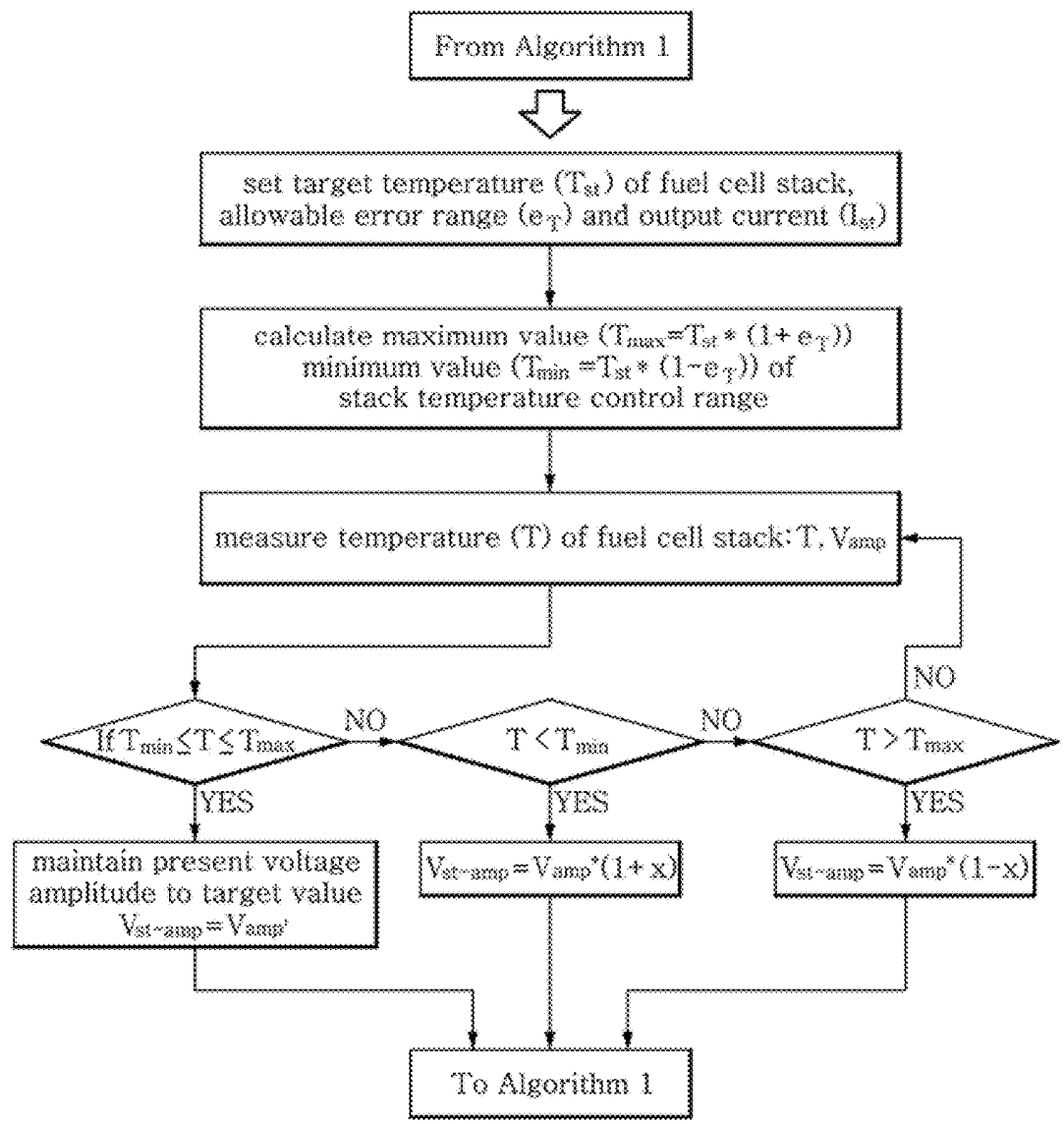
FIG. 5 is a flowchart for illustrating a method for correcting a target value of voltage amplitude when an operation temperature of a stack varies, at the control apparatus according to an embodiment of the present disclosure. For reference, explanation recited in the algorithm 2 of FIG. 5 is just for better understanding, and the present disclosure should not be interpreted as being limited thereto.

FIG. 5 is a flowchart of the algorithm 2 for illustrating a method for automatically tuning target voltage amplitude ($V_{st-amp}$) with reference to stack temperature (T) when stack temperature varies, namely an auto-tuning method. For reference, explanation recited in the algorithm of FIG. 5 is just for better understanding, and the present disclosure should not be interpreted as being limited thereto.

In detail, the algorithm 2 shows an algorithm for automatically tuning a target voltage amplitude ($V_{st-amp}$) with reference to a stack operation temperature (T), so that the target voltage amplitude ($V_{st-amp}$) may be automatically increased or decreased to keep the stack operation temperature (T) within a preset temperature control range.

In an embodiment, the algorithm 2 may be performed at a given location of the algorithm 1 in which an operation is performed in a normal state.

In the algorithm 2 of FIG. 5, first, a target temperature ($T_{st}$) of the stack, an allowable error range ($e_T$) of the stack temperature and an output current ($I_{st}$) are set, and a control range of the stack temperature (T) is determined therefrom. The target temperature ($T_{st}$) and the allowable error range ($e_T$) are put in advance before the fuel cell starts operating, and they may also be corrected in operation on occasions. A maximum temperature ($T_{max}$) and a minimum temperature ($T_{min}$) of the stack temperature may be calculated using the allowable error range ($e_T$) of the stack temperature ($T_{st}$), as in Equation 5 below.

$$T_{max} = T_{st} * (1+e_T)$$

$$T_{min} = T_{st} * (1-e_T) \quad \text{Equation 5}$$

[$T_{max}$: maximum value of the stack temperature, $T_{st}$: target temperature of the stack, $e_T$: allowable error range of the stack temperature, $T_{min}$: minimum value of the stack temperature]

In an embodiment, the allowable error range ($e_T$) of the stack temperature may be 0.01 to 0.3, preferably 0.01 to 0.05.

If the stack temperature control range is set, an operation temperature (T) of the stack is measured, and it is checked whether the measured stack temperature (T) is within the set stack temperature control range.

In an embodiment, if the measured stack operation temperature (T) is within the set stack temperature control range (namely, if the stack operation temperature (T) is smaller than $T_{max}$ and greater than $T_{min}$), the present voltage amplitude ($V_{amp}$) may be set to be the target voltage amplitude ($V_{st-amp}$).

In an embodiment, if the measured stack operation temperature (T) is lower than the minimum temperature ($T_{min}$) of the stack temperature control range, new target voltage amplitude obtained by increasing the present voltage amplitude ($V_{amp}$) by a predetermined ratio (x) is set (namely, $V_{st-amp}=V_{amp}*(1+x)$).

On the contrary, if the measured stack operation temperature (T) is higher than the maximum temperature ($T_{max}$) of the stack temperature control range, the present voltage amplitude ($V_{amp}$) may be decreased over the predetermined ratio (x), and this voltage amplitude may be set as a target voltage amplitude (namely, $V_{st-amp}=V_{amp}*(1-x)$).

In an embodiment, x is 0.01 to 0.9, preferably 0.05 to 0.2.

In an embodiment, a ratio of varying the target voltage amplitude ($V_{st-amp}$) may be within a range of about 1 to 30% in comparison to the present target voltage amplitude ($V_{st-amp}$).

As described above, if the algorithm 2 is used, the target voltage amplitude ($V_{st-amp}$) may be set without using the correlation between the concentration of the diluted fuel and the voltage amplitude.

The algorithm 2 for setting or correcting the target voltage amplitude ($V_{st-amp}$) may be operated whenever the algorithm 1 is performed, or may be performed manually. In addition, before an actual operation, the algorithm 2 may be performed through a preparational operation to obtain the target voltage amplitude ($V_{st-amp}$). As described above, if the algorithm 2 of FIG. 5 is used, the target voltage amplitude ($V_{st-amp}$) may be automatically tuned.

In an embodiment, in the first step, the process of setting a relation between the operating condition and the voltage amplitude ($V_{amp}$) may be replaced with the algorithm 2.

In detail, if the start-up operation is completed and thus the fuel cell stack and the system enter a target operating condition and reach a normal state, the process comes to the third step in a state where the stack output current ($I_{st}$), the stack output voltage ($V_i$) and the stack operation temperature (T) are stable. In this state, the voltage amplitude ($V_{amp}$) is measured in operation, and this is set instead of the initial target voltage amplitude ($V_{st-amp}$). Accordingly, the process of establishing a correlation between the operating condition and the voltage amplitude ($V_{amp}$) may be skipped. In a following operation, if the target voltage amplitude ($V_{st-amp}$) is corrected using the algorithm 2, the fuel cell system may be operated in a more stable condition. By doing so, the target voltage amplitude ($V_{st-amp}$) may be set without performing the first step for obtaining a correlation between a concentration of the diluted fuel and voltage amplitude ($V_{amp}$) under a operating condition.

Figure 6:
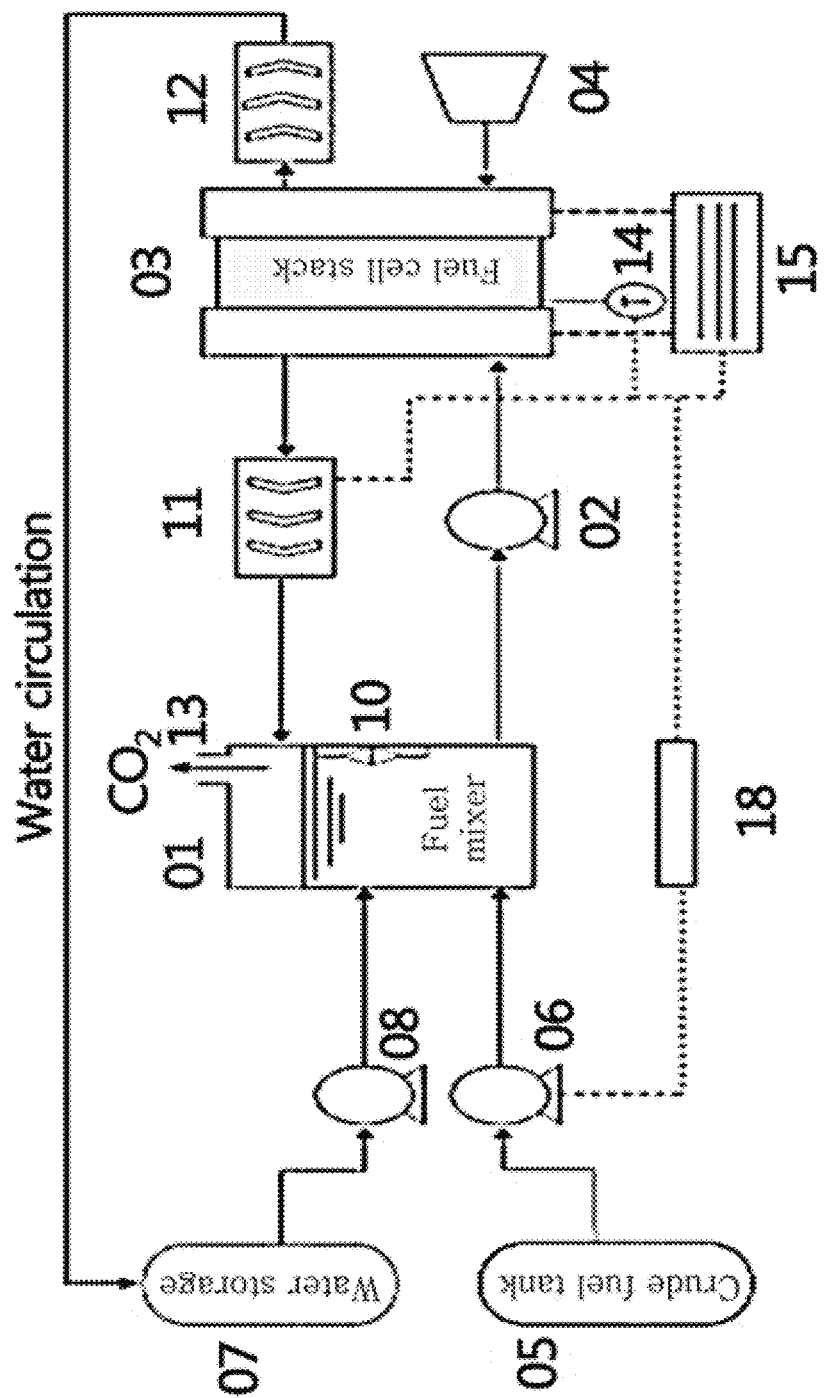
FIG. 6 is a schematic view showing a liquid fuel cell apparatus not having a concentration sensor according to an embodiment of the present disclosure.

Apparatus for Controlling a Fuel Concentration of a Liquid Fuel Cell by Voltage Amplitude Control-Based Feed-Back Control Without Using a Concentration Sensor and a Liquid Fuel Cell Apparatus Using the Same FIG. 6 is a schematic view showing a liquid fuel cell apparatus not having a concentration sensor according to an embodiment of the present disclosure. In detail, FIG. 6 shows a fuel circulation supply system and a fuel cell apparatus, which do not use a fuel concentration sensor. In FIG. 6, reference symbols of all components except for the concentration sensor and the pump are identical to those of FIG. 1, for convenience.

Referring to FIG. 6, in the fuel cell system, a diluted fuel is supplied from a fuel mixer 1 through a fuel circulating pump 2 to the anode inlet of a fuel cell stack 3. In addition, in the fuel cell stack 3, air is supplied from an air supply blower 4 to the cathode inlet of the fuel cell stack 3. The fuel mixer 1 receives a crude fuel from a crude fuel tank 5 through a crude fuel supply pump 6.

The fuel mixer 1 receives water from a water storage 7 through a water supply pump 8, and the water storage 7 is connected to a heat exchanger-type water condenser 12 installed at the cathode outlet of the fuel cell stack 3.

In addition, a liquid level measuring device 10 for measuring a water level of the mixed fuel to keep a volume of the mixed fuel constantly is mounted to the fuel mixer 1.

In the fuel mixer 1, the diluted fuel supplied to the anode of the fuel cell stack 3 is reacted and then discharged from the stack with a lowered fuel concentration, and then the diluted fuel passes through the heat exchanger 11 to lower temperature and is injected to the fuel mixer 1 at which a gas-liquid separator is installed.

The crude fuel supply pump 6 is connected to the fuel mixer 1 to supply fuel to the fuel mixer 1 as much as consumed by the fuel cell stack 3 so that the diluted fuel in the fuel mixer can maintain its target concentration.

In addition, the heat exchanger includes metal pipes and metal fins surrounding the metal pipes, which are designed to dissipate heat from a mixture solution or humidified mixture gas supplied to the heat exchanger, and thus it is possible to increase a specific surface area of the metal and an area of the metal which contacts air, thereby increasing a heat exchange rate. A unit for removing heat from the heat exchanger (for example, a blower (or, an air blowing fan) for blowing air to remove heat from the heat exchanger) may be included.

The air (carbon dioxide or the like) generated at the anode of the fuel cell stack 3 is introduced to the fuel mixer 1 through the heat exchanger 11 of the circulation system together with a non-reacted fuel, passes through the gas-liquid separator mounted at the fuel mixer 1 and is then discharged out through a released gas discharging unit 13.

A temperature measuring device 14 and a voltage and output current measuring device 15 are respectively mounted at the fuel cell stack 3 to measure temperature as well as voltage and output current densities of the fuel cell.

The heat exchanger 11, the temperature measuring device 14 and the voltage and output current density measuring device 15 are connected to a control apparatus 18 and utilized for calculating a fuel consumption rate or fuel consumption rate at the fuel cell stack as well as a heat dissipation rate of the heat exchanger.

In an embodiment, the control apparatus 18 may be coupled to a computer device. The control apparatus 18 may be connected to a device for measuring an output current of a liquid fuel apparatus, an output voltage, and internal temperature and pressure of the fuel cell stack, and may perform the above voltage amplitude and temperature control process.

In detail, the control apparatus 18 may include: a first processing unit for measuring an output voltage amplitude ($V_{amp}$) according to an operating condition of the liquid fuel cell and establishing a correlation between a consumption rate of a diluted fuel and the voltage amplitude ($V_{amp}$) under the operating condition; a second processing unit of setting an actual operating condition including target voltage amplitude ($V_{st\text{-}amp}$) and target stack temperature ($T_{st}$) based on the correlation between the consumption rate of the diluted fuel and the voltage amplitude ($V_{amp}$); and a third processing unit for measuring present voltage amplitude ($V_{amp}$) of the stack, measuring the present voltage amplitude ($V_{amp}$) with the target voltage amplitude ($V_{st\text{-}amp}$) to calculate an error, calculating an output quantity required for feed-back control by using the error value, and sending a signal according to the output quantity to a fuel supply unit.

In an embodiment, the actual operating condition may further include an output current ($I_{st}$).

In an embodiment, the fuel concentration control apparatus may include an auto-tuning unit for varying the target voltage amplitude ($V_{st\text{-}amp}$) according to the stack operation temperature (T), and the auto-tuning unit may measure a stack operation temperature (T), compare the stack operation temperature (T) with the target temperature ($T_{st}$) to calculate an error, calculate an output quantity required for control in proportion to the error value, and send a signal according to the output quantity to a controller of the fuel supply unit and the heat exchanger.

In detail, if the operation temperature (T) of the fuel cell stack is higher than a maximum temperature ($T_{max}$) of the error range of the target operation temperature ($T_{st}$), the target voltage amplitude ($V_{st\text{-}amp}$) is lowered, and if the operation temperature (T) of the fuel cell stack is lower than a minimum temperature ($T_{min}$) of the error range of the target operation temperature ($T_{st}$), the target voltage amplitude ($V_{st\text{-}amp}$) is raised. Here, a ratio of varying the target voltage amplitude ($V_{st\text{-}amp}$) may be 1 to 30% in comparison to the voltage amplitude ($V_{st\text{-}amp}$).

In an embodiment, the maximum temperature ($T_{max}$) and the minimum temperature ($T_{min}$) of the stack may be respectively calculated according to Equation 1, and the allowable error range ($e_T$) of the stack temperature may be 0.01 to 0.05.

$$T_{max} = T_{st} * (1+e_T)$$

$$T_{min} = T_{st} * (1-ee_T) \quad \text{Equation 1}$$

[In Equation 1, $T_{max}$ represents a maximum value of the stack temperature, $T_{st}$ represents a target temperature of the stack, $e_T$ represents an allowable error range of the stack temperature, and $T_{min}$ represents a minimum value of the stack temperature.]

In an embodiment, the auto-tuning unit may be operated as a substitution for operating the first processing unit.

In an embodiment, voltage amplitude ($V_{amp}$) measured for the first time when the fuel cell reaches a target operating condition after passing a start-up period or enters a normal state after reaching the target operating condition may be used as the target voltage amplitude ($V_{st\text{-}amp}$), as a substitution for operating the first processing unit.

Moreover, when the third processing unit starts operating, a crude fuel supply rate ($P_{fuel}$) at an initial stage may be identical to a crude fuel supply rate ($P_{fuel}$) at a final stage of the start-up period.

Meanwhile, in an embodiment, a liquid fuel used in the liquid fuel cell is any one reactant selected from the group consisting of methanol, ethanol, formic acid, isopropanol, propanol, ethylene glycol, dimethyl ether, butanol, hydrogen, butane, ethane, propane, boron compounds or boron hydrides, carbon dioxide, water, bio materials, and their mixtures.

In an embodiment, the crude fuel supply rate ($P_{fuel}$) may be determined by multiplying a value calculated by using an output current ($I_{st}$) according to the operation of the liquid fuel cell and a Faraday constant by a predetermined number, and the number is determined by using any one of P, PI and PID solely or using P, PI and PID alternately.

In an embodiment, the voltage amplitude ($V_{amp}$) may be calculated from a difference between a maximum voltage ($V_{max}$) and a minimum voltage ($V_{min}$) measured during the voltage amplitude measurement period ($t_{st}$), or calculated by a difference between average values of first and second groups, which are classified so that the first group includes values greater than an average value of all voltage values in the voltage amplitude measurement period ($t_{st}$) and the second group includes values smaller than the average value of the all voltage values.

In addition, the voltage amplitude measurement period ($t_{st}$) may be 1 to 30 seconds.

Moreover, if the measured voltage amplitude ($V_{amp}$) is greater than the target voltage amplitude ($V_{st\text{-}amp}$), the supply rate ($P_{fuel}$) of the crude fuel may be decreased, and if the measured voltage amplitude ($V_{amp}$) is smaller than the target voltage amplitude ($V_{st\text{-}amp}$), the supply rate ($P_{fuel}$) of the crude fuel may be increased.

In an embodiment, in the third processing unit, a supply rate ($P_{fuel}$) of the crude fuel may be calculated based on the voltage amplitude ($V_{amp}$) by using a feed-back controller based on the voltage amplitude ($V_{amp}$), and the feed-back controller may use any one of P, PI and PID solely or use P, PI and PID alternately.

In an embodiment, when the fuel cell is in operation, the operation of the fuel cell apparatus may be stopped if an average output voltage of unit cells of the fuel cell stack is lower than 0.1 to 0.2V, if a voltage ($V_i$) of any one of the unit cells is lower than 0.0 to 0.1V, or if an operation temperature (T) of any one of the unit cells is higher than 90 to 100° C.

Since the fuel cell system according to an embodiment of the present disclosure is a sensor-less type not using a concentration sensor as described above, the fuel cell system may have a simple and small design, which may save power consumed for operating the system and lower a price of the system.

In addition, the apparatus for controlling a fuel concentration of a fuel cell and the liquid fuel cell apparatus using the same according to an embodiment of the present disclosure may actively control a supply rate of a crude fuel to enhance performance.

Moreover, in the apparatus for controlling a fuel concentration of a fuel cell and the liquid fuel cell apparatus using the same according to an embodiment of the present disclosure, when the fuel cell operates for a long term, if water flooding increases at the cathode to increase voltage amplitude, the controller may actively lower a concentration of the diluted fuel to reduce water flooding, thereby normally maintaining the performance of the stack.

Finally, in the apparatus for controlling a fuel concentration of a fuel cell and the liquid fuel cell apparatus using the same according to an embodiment of the present disclosure, since voltage amplitude is controlled even though an external temperature varies, a concentration of the fuel may be controlled by adjusting the voltage amplitude, and accordingly the variation of the external temperature may be actively handled.

Hereinafter, an embodiment of the present disclosure will be described with reference to the accompanying drawings. Even though the present disclosure is described based on an embodiment depicted in the drawings, this is just an example, and the technical features and essences of the present disclosure are not limited thereto.

EXPERIMENTAL EXAMPLE 1: ESTABLISHMENT OF A CORRELATION BETWEEN A METHANOL CONCENTRATION AND VOLTAGE AMPLITUDE

An experiment was performed with a unit cell (Example 1) of a direct methanol fuel cell which uses methanol as a fuel.

Figure 1:
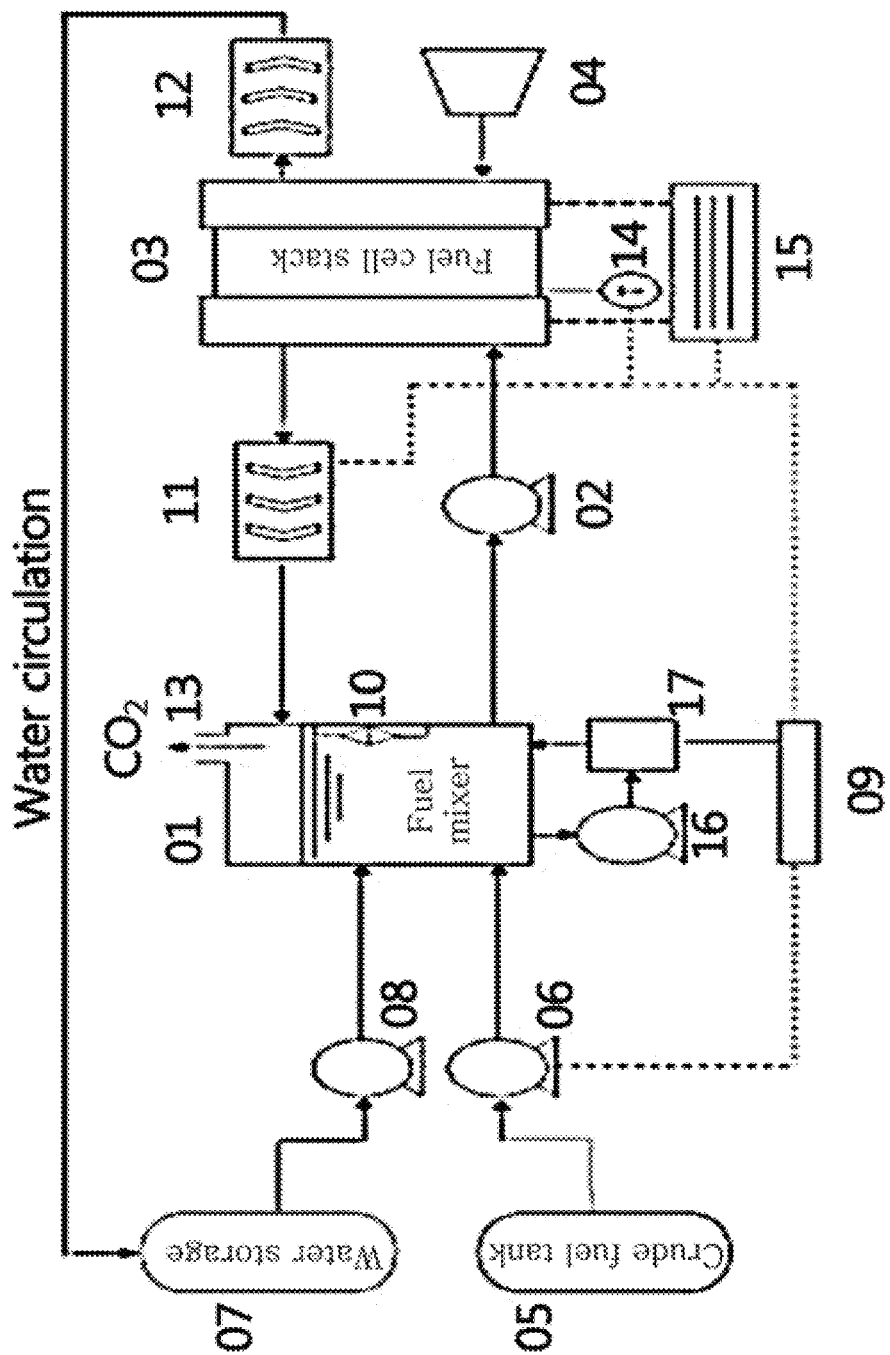
FIG. 1 is a schematic view showing an existing fuel cell apparatus having a concentration sensor.

In the experimental example of the present disclosure, voltage amplitude of a 200 W-level direct methanol fuel cell stack was measured. The fuel cell stack used in the experiment is composed of 20 sheets of membrane electrode assembly (MEA). The MEA has an electrode area of 150 $cm^2$, and Nafion 115 produced by Dupont was used as an electrolyte membrane. An anode catalyst was Pt—Ru with 6 $mg/cm^2$, and a cathode catalyst was Pt with 2 $mg/cm^2$. A separator had parallel serpentine-type channels formed in a conductive graphite plate, a diluted fuel supply rate was 240 ml/min, and an air supply rate was 22 l/min (dry air). The fuel cell stack is connected to a fuel cell system as shown in FIG. 1. First, a voltage variation was observed while increasing the methanol concentration of the fuel supplied to the stack from 2.4 wt % to 4.2 wt % at every 20 minutes by 0.2 wt %. The observation result is depicted in FIG. 7.

Figure 7A:
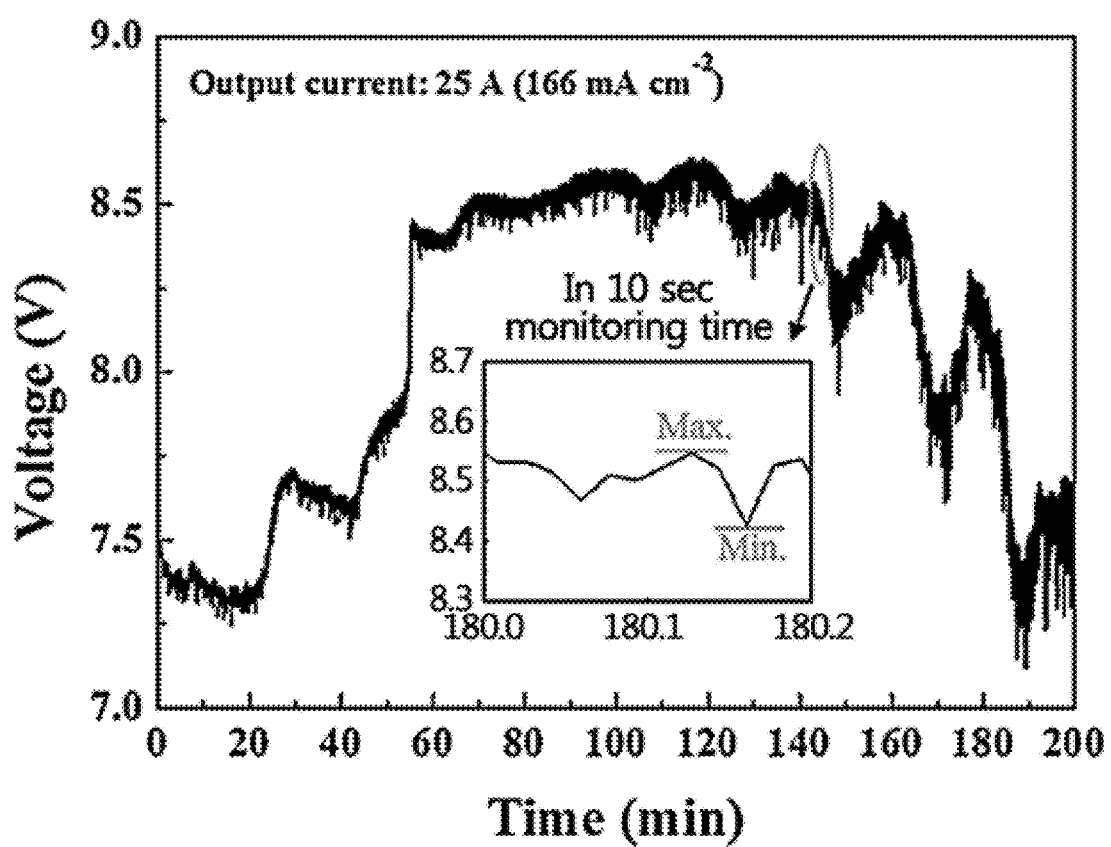
FIGS. 7A to 7C show a variation of an output voltage when a concentration of a diluted fuel supplied to a fuel cell stack is varied at intervals of 20 minutes, in an embodiment of the present disclosure. Here.
Figure 7B:
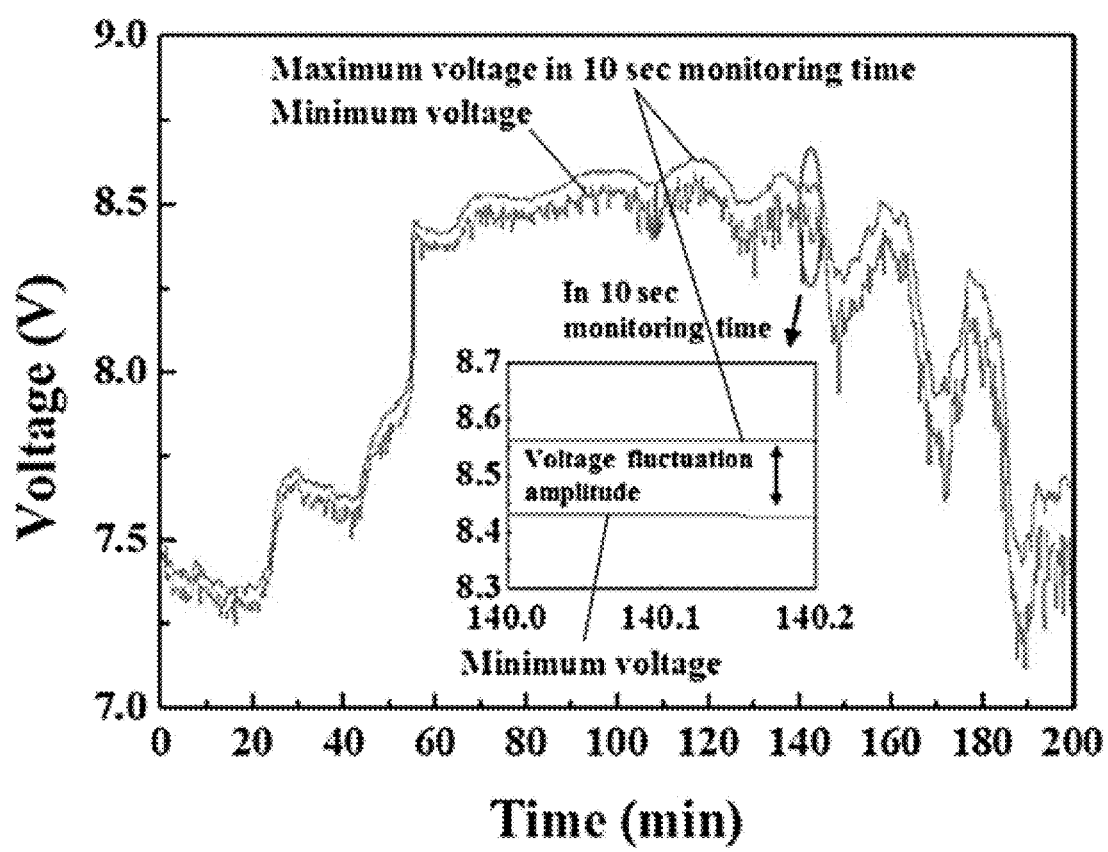
Figure 7C:
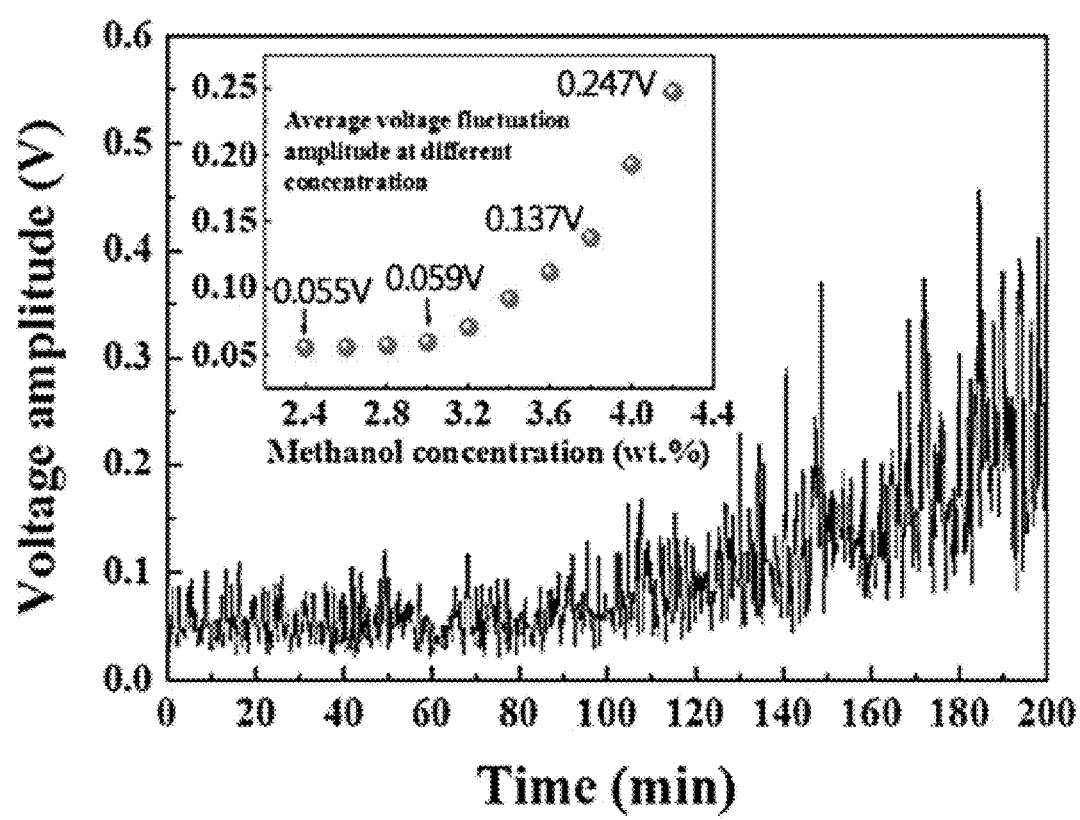

FIG. 7A depicts a variation of an output voltage when a concentration of a diluted fuel supplied to a fuel cell stack is varied at intervals of 20 minutes, in an embodiment of the present disclosure. FIG. 7B is a graph showing a maximum voltage and a minimum voltage at every 10 seconds selectively from the graph of FIG. 7A, and depicts curves of the maximum voltage and the minimum voltage, respectively. FIG. 7C shows a variation of voltage amplitude according to time by obtaining amplitude from the maximum voltage and the minimum voltage of FIG. 7B. Here, a small graph of FIG. 7C shows a variation of voltage amplitude according to a methanol concentration, prepared by recombining FIG. 7C.

Referring to FIGS. 7A to 7C, it can be found that a voltage fluctuates with small amplitude even in a period with a constant concentration, and as the methanol concentration increases, the voltage temporarily increases and then decreases again. In addition, when the methanol concentration is 2.8 wt % to 3.4 wt %, the voltage was substantially constantly maintained, and if the concentration increases further, the voltage amplitude increases and the voltage is lowered.

In other words, it can be understood that as the methanol concentration increases, the voltage amplitude increases geometrically. This is determined as being caused from the fact that as a methanol concentration increases, crossover of methanol from the anode to the cathode of the stack increases, and accordingly voltage instability caused by water flooding at the cathode increases. From this experiment result, a correlation between the methanol concentration and the voltage amplitude could be established.

EXPERIMENTAL EXAMPLE 2: CONTROL OF METHANOL CONCENTRATION ACCORDING TO VOLTAGE AMPLITUDE CONTROL BY THE ALGORITHM 1

A fuel cell stack and system and an operating condition identical to those of Example 1 were used, and an experiment for methanol concentration control was performed using the algorithm 1 of FIG. 4. However, in this experimental example, voltage amplitude was set to be 0.05V so that a methanol concentration of the diluted fuel supplied to the stack becomes 3.0 wt % (Example 2).

Figure 8A:
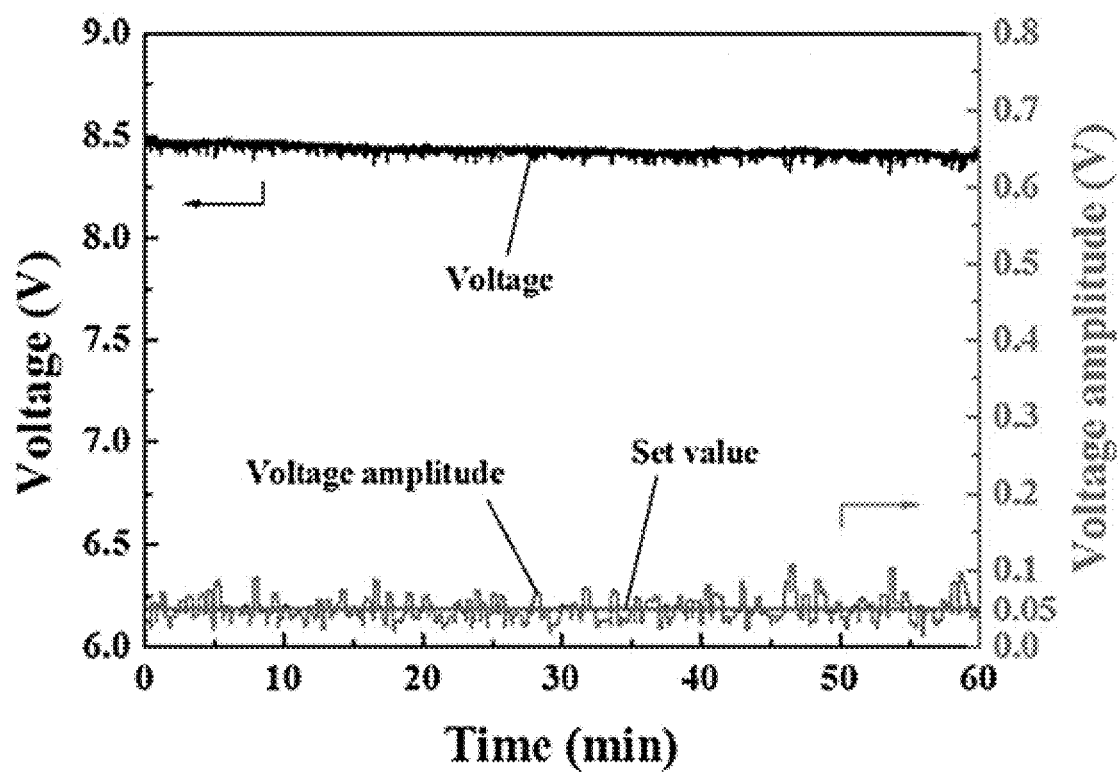
FIGS. 8A and 8B are graphs showing results when a fuel cell stack is operated while setting a target value of voltage amplitude to be 0.05V, in an embodiment of the present disclosure. In detail.
Figure 8B:
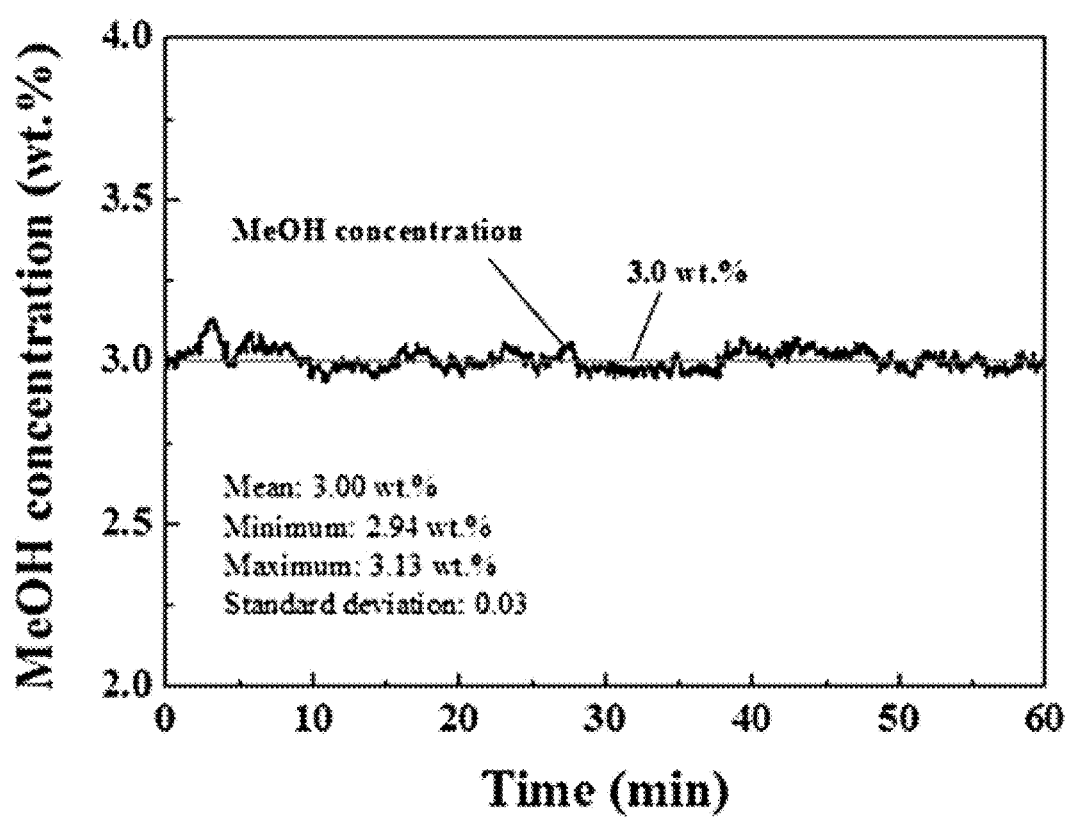

FIG. 8A is a graph showing a voltage obtained when a fuel cell stack is operated while a target value of voltage amplitude is set to be 0.05V, and FIG. 8B is a graph showing a concentration of the diluted fuel at this time.

Referring to FIG. 8A, it can be found that the voltage amplitude is controlled near 0.05V which is a target value, and in this condition, the voltage of the fuel cell stack is also stably maintained near 8.3 to 8.5V. Referring to FIG. 8B, it can be found that a concentration of the methanol diluted fuel is also stably maintained at 3.0 wt %. Accordingly, it can be understood that when voltage amplitude is maintained constantly by using the sensor-less control apparatus according to an embodiment of the present disclosure, a concentration of the diluted fuel may be constantly controlled.

EXPERIMENTAL EXAMPLE 3: COMPARISON BETWEEN METHANOL SENSOR CONTROL AND SENSOR-LESS CONTROL

In Experimental Example 3, a result of controlling a concentration of a diluted fuel by using a concentration sensor (Comparative Example 1) and a result of controlling a concentration of a diluted fuel by controlling voltage amplitude without using a concentration sensor were compared according to an operation time. In both experiments, the target concentration was set to be 3.2 wt %, and in the sensor-less concentration control, the target voltage amplitude was set to be 0.07V (Example 3). Other operating conditions are identical to those of Example 1.

Figure 9A:
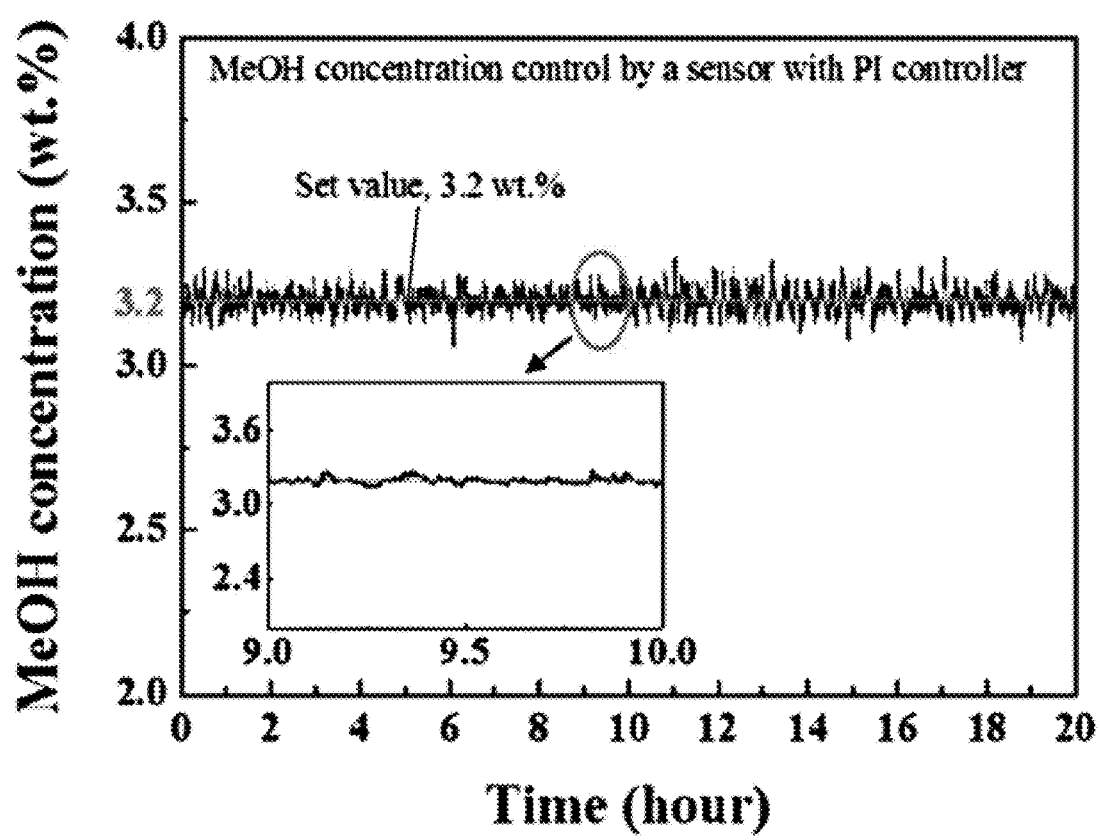
FIGS. 9A to 9C are graphs showing concentration control results of a fuel cell according to an operation time, when a concentration of diluted fuel is controlled using a sensor and when a concentration of diluted fuel is controlled by voltage amplitude control without using a sensor, in an embodiment of the present disclosure. In detail.
Figure 9B:
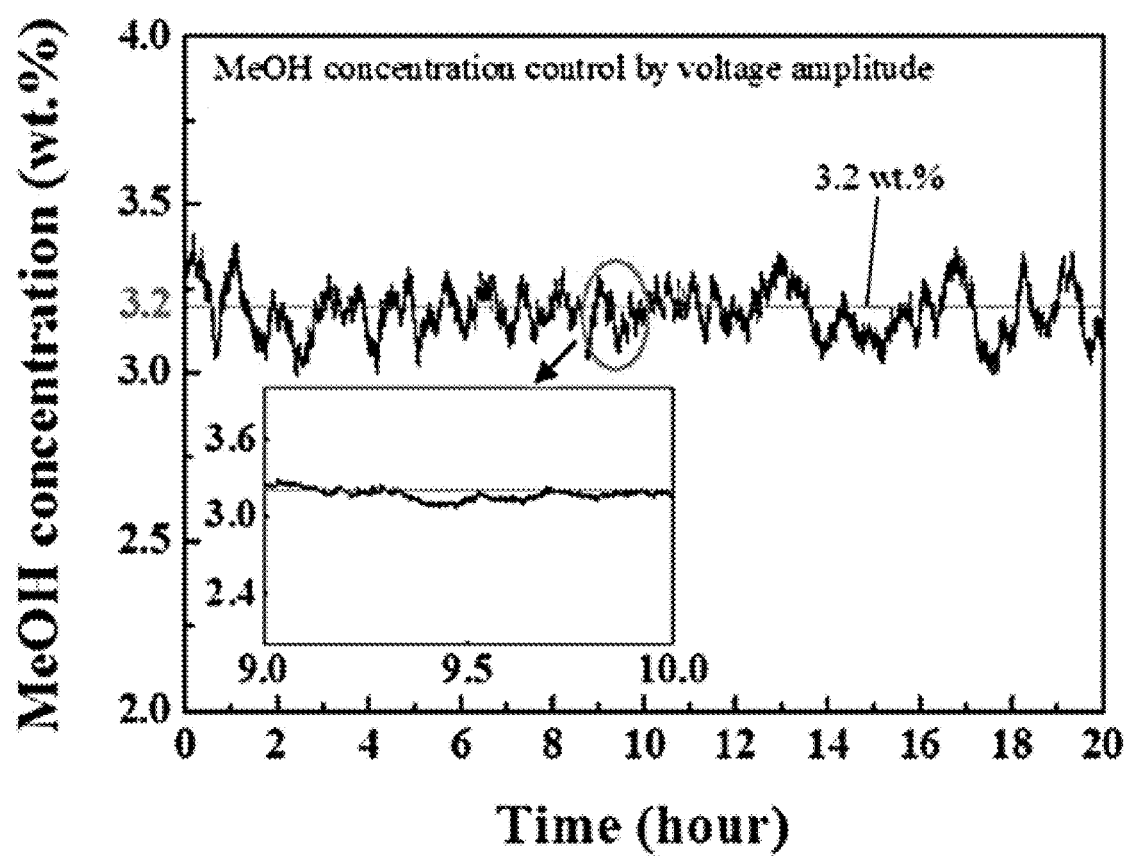

After that, a result of controlling a concentration of a diluted fuel by using a sensor is depicted in FIG. 9A, and a result of controlling a concentration of a diluted fuel by controlling voltage amplitude without using a sensor is depicted in FIG. 9B. In addition, a comparison result of variations of an output voltage according to time in both operations is depicted in FIG. 9C.

Referring to FIG. 9A, it can be found that the concentration is more stably maintained near 3.2 wt % when a methanol sensor is used. Meanwhile, as shown in FIG. 9B, it can be found that the sensor-less concentration control result shows a greater concentration variation in comparison to the concentration control result using a methanol sensor. However, since the performance of the stack is differently exhibited in a long-term operation, a long-term operation was examined further, rather than a short-term operation.

Figure 9C:
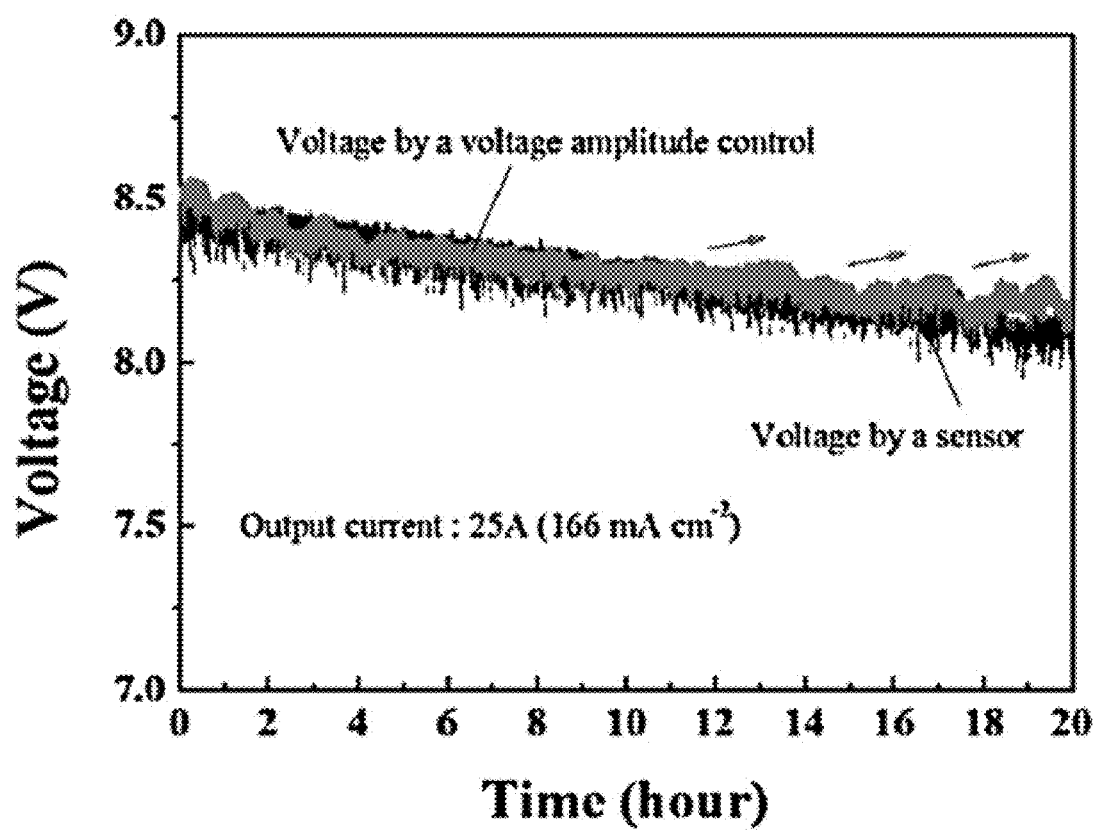

Seeing a voltage variation of the stack depicted in FIG. 9C, after continuous operation of 12 hours, it can be found that the stack voltage is maintained higher in a sensor-less operation, rather than a case using a methanol sensor.

In other words, if a methanol concentration was controlled using a methanol sensor, the voltage of the stack was slowly lowered, but in the sensor-less control, the voltage was maintained relatively higher. The performance deteriorates in the continuous operation due to several reasons, and a representative reason is water flooding occurring at the cathode. In other words, if water generated at the cathode is not effectively removed, water is collected in the electrode to lower a reaction rate, which is water flooding, and accordingly the performance of the stack deteriorates. If water flooding appears, a mass transfer rate of reactants is lowered, and a reaction rate becomes instable, which increases voltage amplitude. Therefore, even though the methanol concentration is maintained constantly at a target value, if water flooding is not prevented, the voltage amplitude increases and the performance deteriorates. The control method using a methanol sensor is advantageous in maintaining a concentration constantly, but when water flooding appears at the cathode, it is not possible to solve or prevent water flooding. Meanwhile, in the sensor-less concentration control method using voltage amplitude, if voltage amplitude increases due to water flooding, the methanol concentration is reduced to lower amplitude, and accordingly the water flooding is solved and thus the stack performance may be maintained high.

EXPERIMENTAL EXAMPLE 4: EVALUATION OF CONTROL EFFICIENCY OF A FUEL CONCENTRATION CONTROL APPARATUS NOT USING A CONCENTRATION SENSOR ACCORDING TO A VARIATION OF EXTERNAL TEMPERATURE

A concentration of a methanol fuel was controlled with the sensor-less concentration controller by using a 400 W direct methanol fuel cell system. The fuel cell system used in Experimental Example 4 is identical to the fuel cell system of FIG. 1, employed in Example 1, except that the fuel cell stack is exchanged with a 400 W full cell stack. In addition, when the fuel cell is in operation, an injection rate of reactants, namely a methanol solution and air, was twice of that of Example 1 (Example 4). Other fuel cell operating conditions were identical to those of Example 1.

Figure 10A:
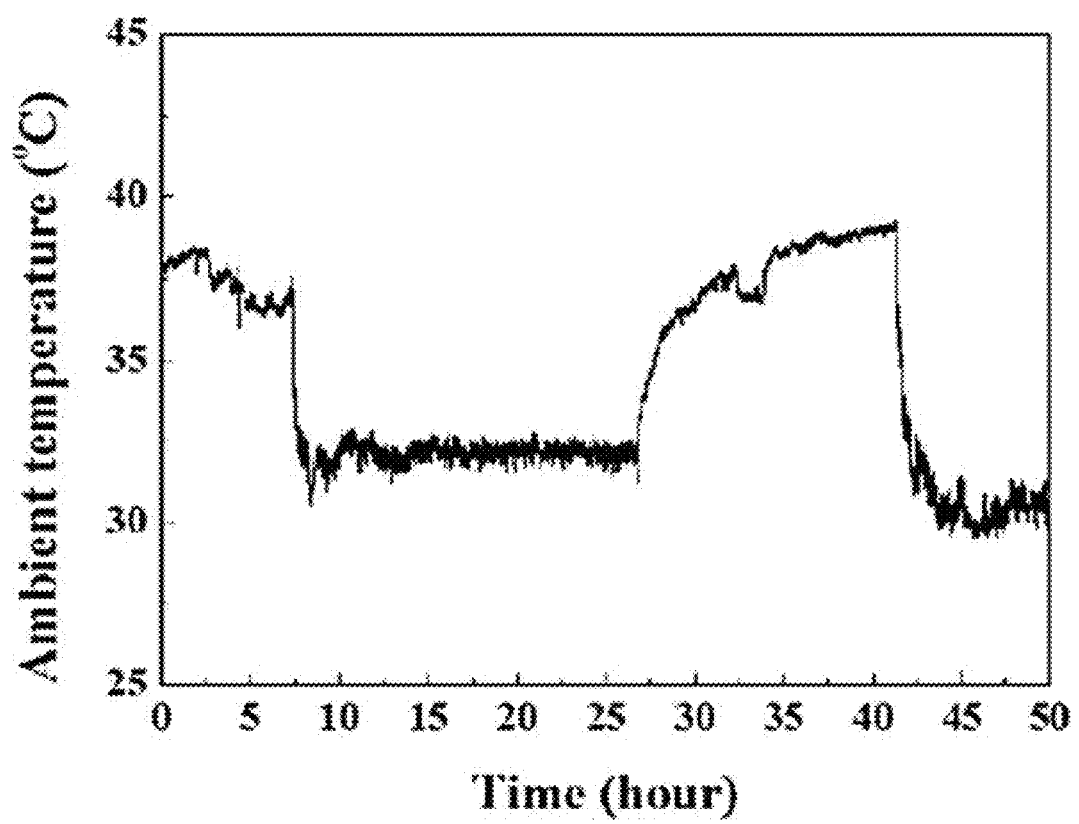
FIGS. 10A to 10D are graphs showing a variation of stack temperature according to an external temperature variation, a variation of a concentration of diluted fuel and a variation of voltage and power, when the concentration of diluted fuel is controlled using a control apparatus not using a concentration sensor according to an embodiment of the present disclosure. In detail.

In detail, a fuel cell system was operated for 50 hours in total by using the sensor-less concentration controller, and at this time, the experiment was performed while varying external temperature to 37° C. and 32° C. as shown in FIG. 10A. The variation of external temperature results in a variation of heat emission at the fuel cell system including the stack, and thus temperature of each component is varied. After that, when external temperature of the fuel cell system was varied as shown in FIG. 10A, variations of temperature of each component of the fuel cell system, a concentration of methanol fuel injected to the fuel cell stack and an output voltage of the fuel cell stack were measured, as shown in FIGS. 10B to 10D.

Figure 10B:
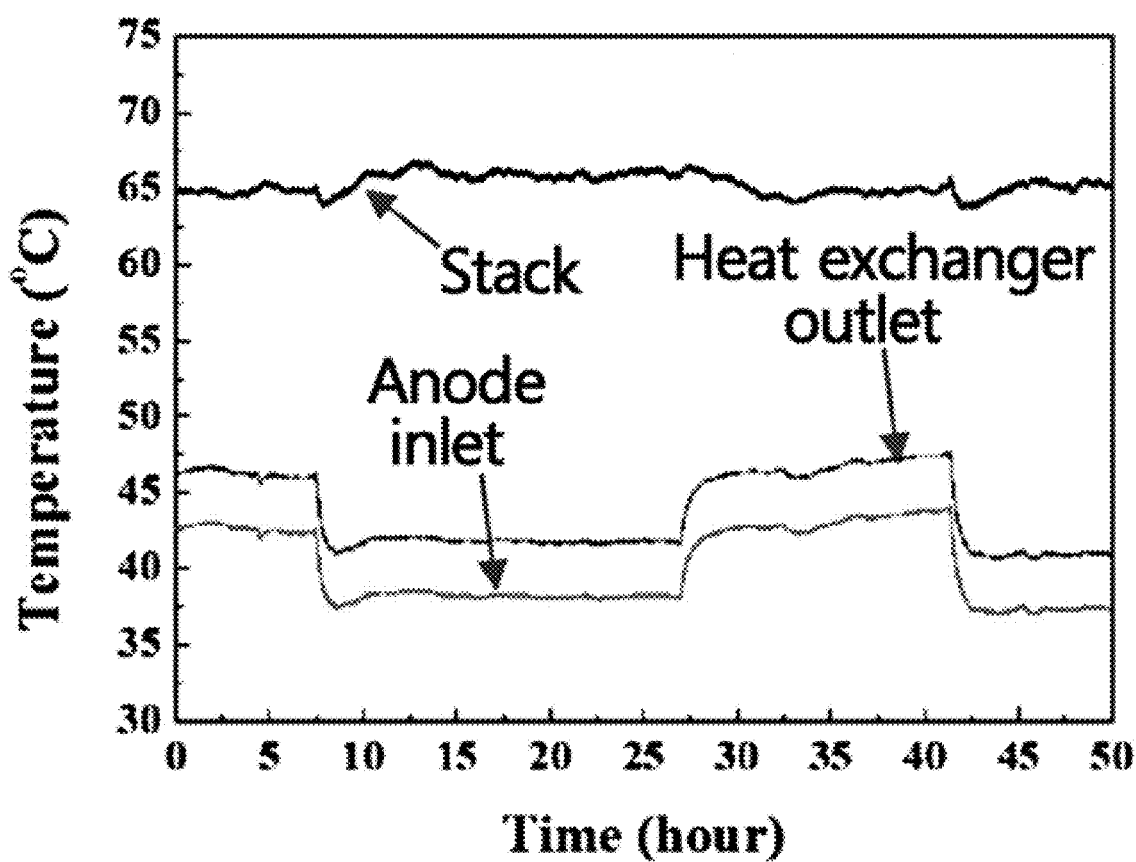

Referring to FIG. 10B, it can be found that as external temperature is varied, temperature of the fuel supplied to the anode of the stack and temperature of the methanol solution emitted from the heat exchanger connected to the anode outlet are varied. At this time, it can be found that the stack operation temperature (T) is not greatly varied but constantly maintained at about 65° C. In spite of the variation of external temperature, the stack temperature is constantly maintained because the sensor-less concentration controller actively varies a supply rate of the crude methanol fuel according to the variation of external temperature by using the sensor-less concentration control method utilizing voltage amplitude.

Figure 10C:
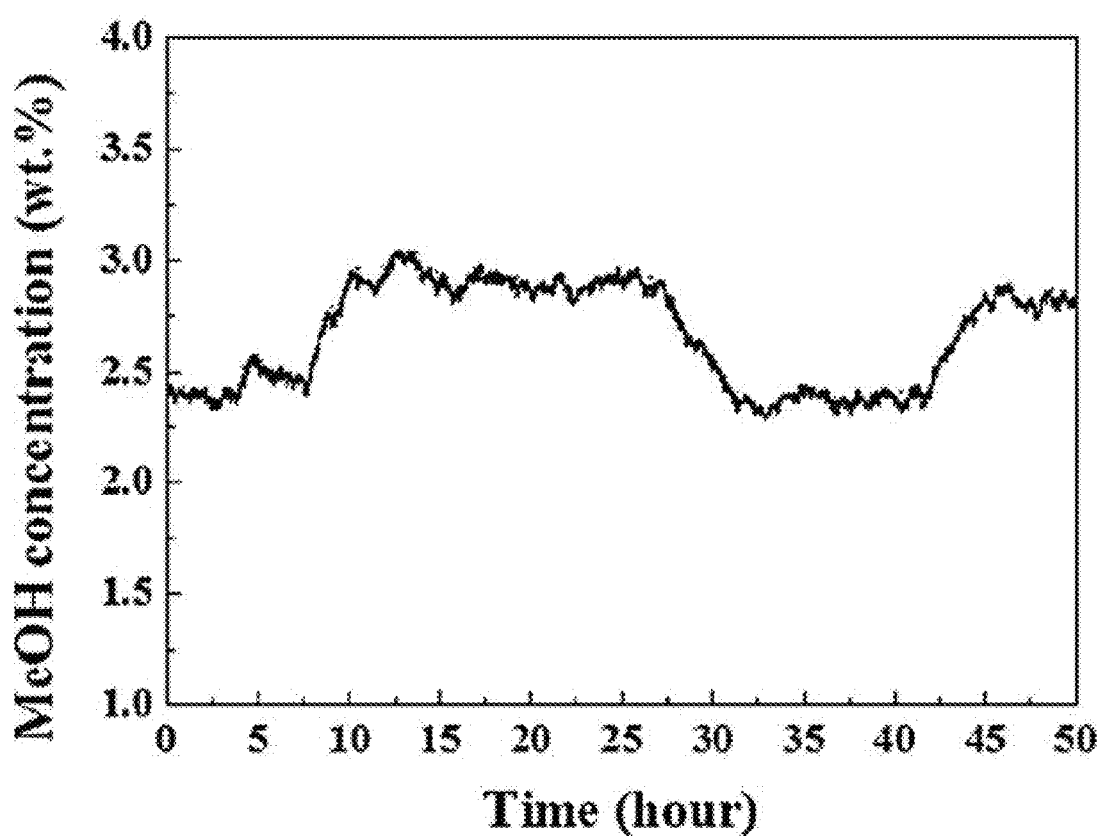

Referring to FIG. 10C, if external temperature is high (0 to 7 hours, 30 to 41 hours), a concentration of the methanol solution is lowered and maintained at about 2.4 wt %, and if the external temperature is low (7 to 30 hours, 41 to 50 hours), the concentration is increased and maintained at about 2.9 wt %. Accordingly, it can be found that as the sensor-less concentration controller actively varies a supply rate of the crude methanol fuel according to the variation of external temperature, a concentration of the methanol diluted fuel is varied according to the external temperature. In addition, it can be found that the stack operation temperature (T) is constantly maintained at about 65° C. due to the above control method.

Figure 10D:
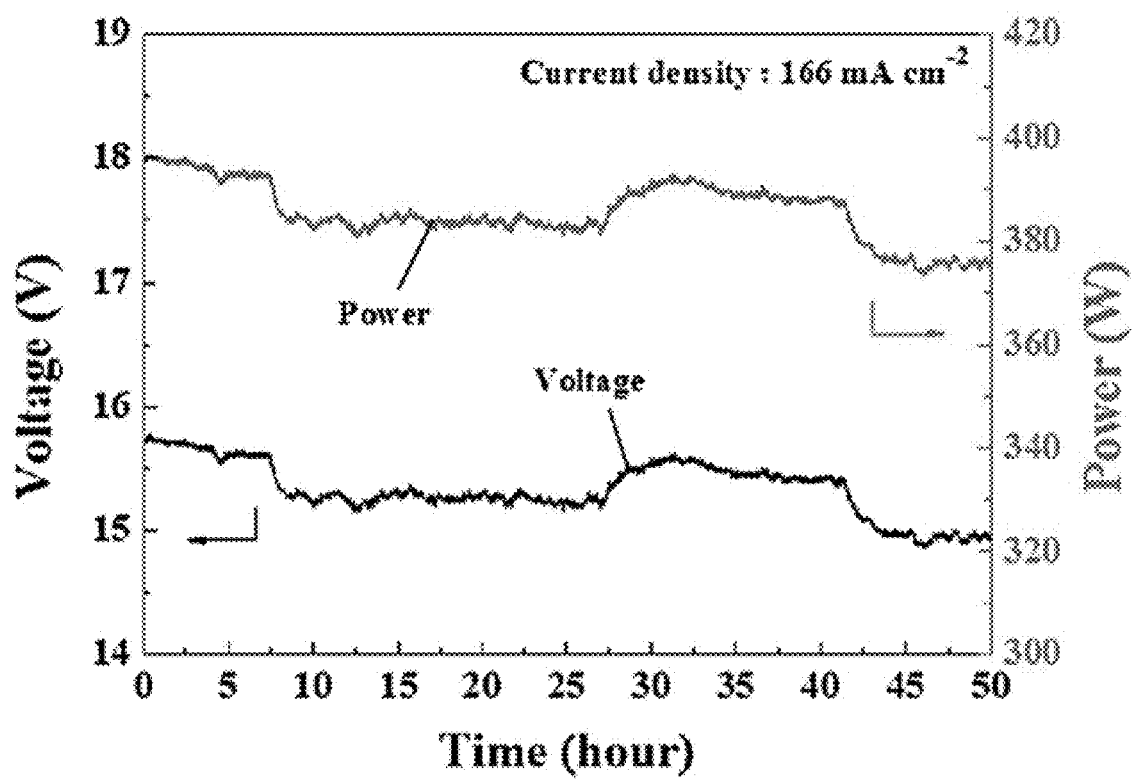

FIG. 10D is a graph showing a variation of voltage and power (voltage×current) of a fuel cell stack in an operation of 50 hours. Referring to FIG. 10D, it can be found that voltage and power are maintained high in a time band when external temperature is high (0 to 7 hours, 30 to 41 hours), but voltage and power are maintained low in a time bane when external temperature is low (7 to 30 hours, 41 to 50 hours).

The sensor-less concentration controller controls a supply rate of a crude methanol fuel by feeding back voltage amplitude. The voltage amplitude increases in proportion to a rate of water generated at the cathode of the stack, and the rate of the generated water is also influenced by a rate methanol passing from the anode to the cathode. If the external temperature rises, temperature of the methanol diluted fuel supplied to the anode of the stack rises. The raised temperature of the methanol mixture solution increases a rate of methanol passing from the anode to the cathode through the electrolyte membrane. This increases a rate of water generated at the cathode of the stack and increases voltage fluctuation amplitude. At this time, the sensor-less controller actively reduces a supply rate of the crude methanol fuel in order to lower the increased voltage amplitude, and by doing so, the concentration of the methanol diluted fuel supplied to the stack is decreased as shown in FIG. 10C. If the concentration of the methanol diluted fuel supplied to the stack is decreased, methanol crossover at the fuel cell stack is decreased, which reduces heat generation at the stack. Thus, even though external temperature rises, the stack operation temperature (T) is lowered or constantly maintained without a great variation.

On the contrary, if external temperature is decreased to lower the stack operation temperature (T) and thus the stack performance deteriorates to decrease voltage amplitude, the sensor-less concentration controller increases a supply rate of the crude methanol fuel in order to increase voltage amplitude. By doing so, as shown in FIG. 10C, a concentration of the methanol diluted fuel supplied to the stack is increased, and methanol crossover increases, which increases heat generation at the stack. Therefore, as shown in FIG. 10B, the stack operation temperature (T) is raised again.

EXPERIMENTAL EXAMPLE 5: SENSOR-LESS CONCENTRATION CONTROL SYSTEM AND ENERGY EFFICIENCY

A comparative experiment was performed to check the influence on energy efficiency of the entire fuel cell system by the sensor-less concentration controller for controlling a concentration by using voltage amplitude. Experiment results of Example 4 were used as experimental data of the sensor-less concentration controller of Experimental Example 5. Comparative Example 2 was performed under the same condition as Example 4, for the comparison with Example 4, except that a crude methanol fuel is supplied to the fuel mixer at a constant rate. At this time, the supply rate of the crude methanol fuel supplied to the fuel mixer was identical to a methanol consumption rate under the operating condition (set based on an output current in a normal state, external temperature and stack temperature) of the fuel cell system of Example 4. In other words, by constantly maintaining the supply rate of the crude methanol fuel supplied to the fuel mixer under a given operating condition, a concentration of the diluted fuel supplied to the fuel cell stack was constantly maintained to be 2.9 wt %. At this time, the external temperature was set to be 30° C. and 40° C., and even though the external temperature varies, the supply rate of the crude fuel was maintained constantly.

Figure 11A:
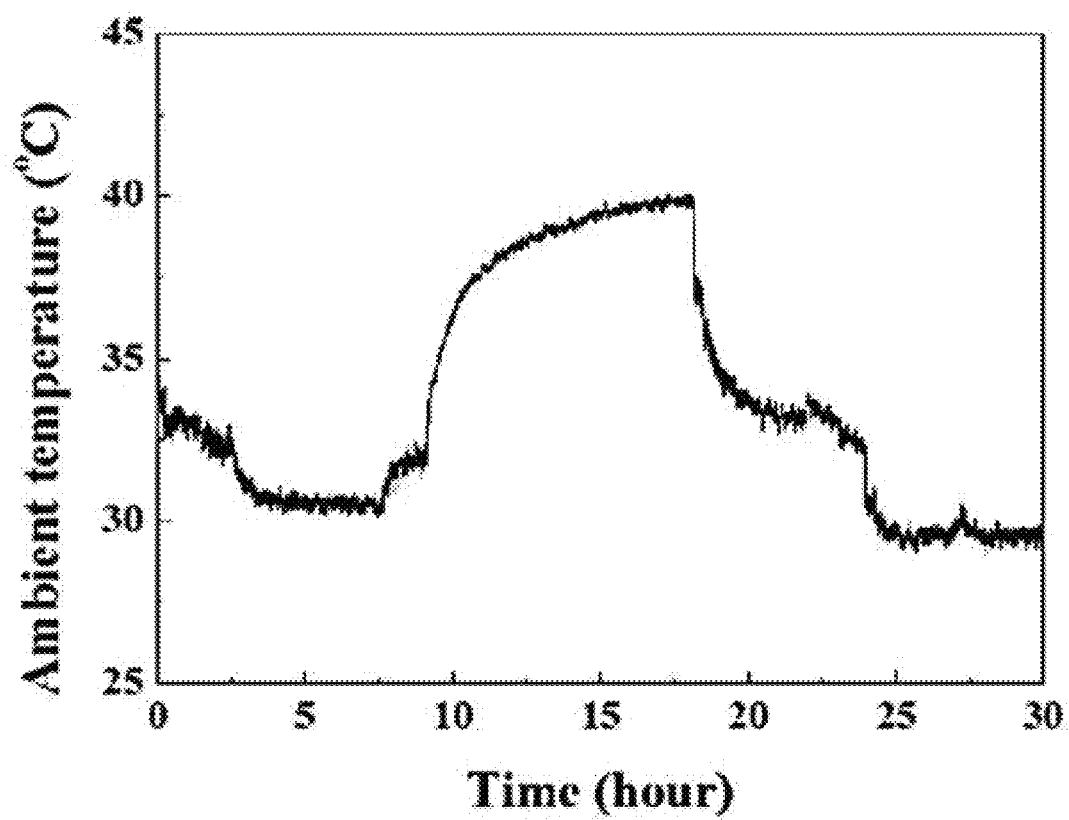
FIGS. 11A to 11D are graphs showing a variation of stack temperature, a variation of a concentration of diluted fuel and a variation of voltage and power, when a crude fuel is supplied to a fuel mixer at a constant rate regardless of external temperature, according to a comparative example. In detail.
Figure 11B:
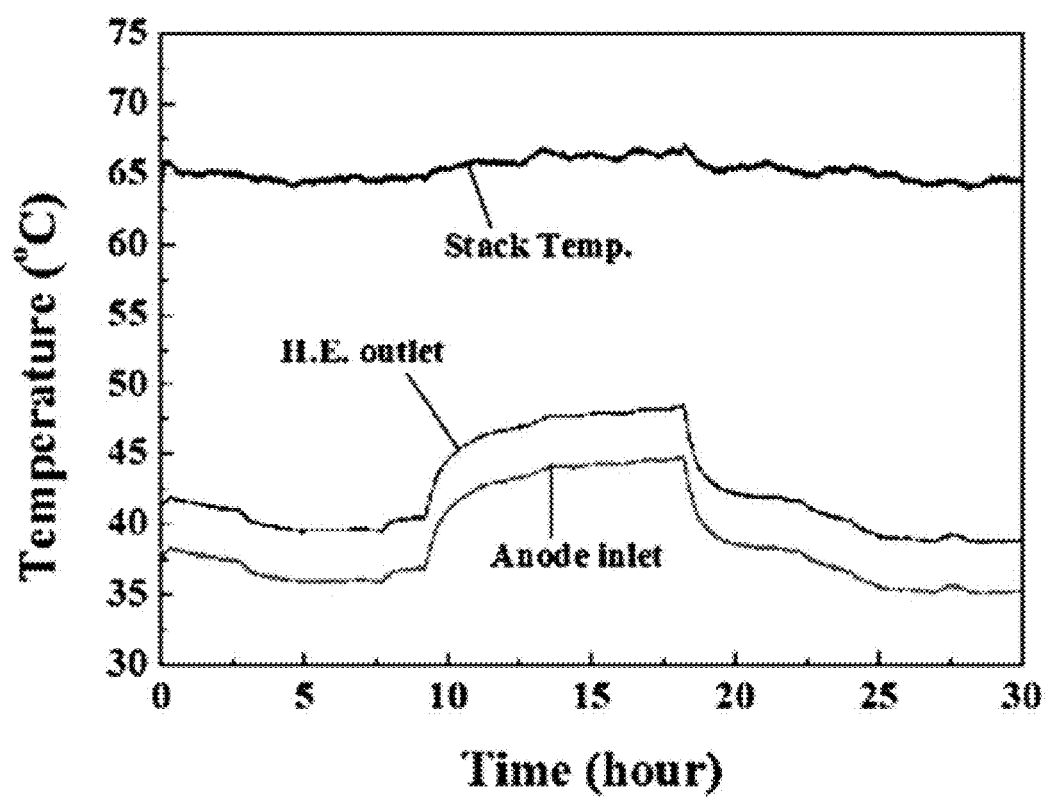
Figure 11C:
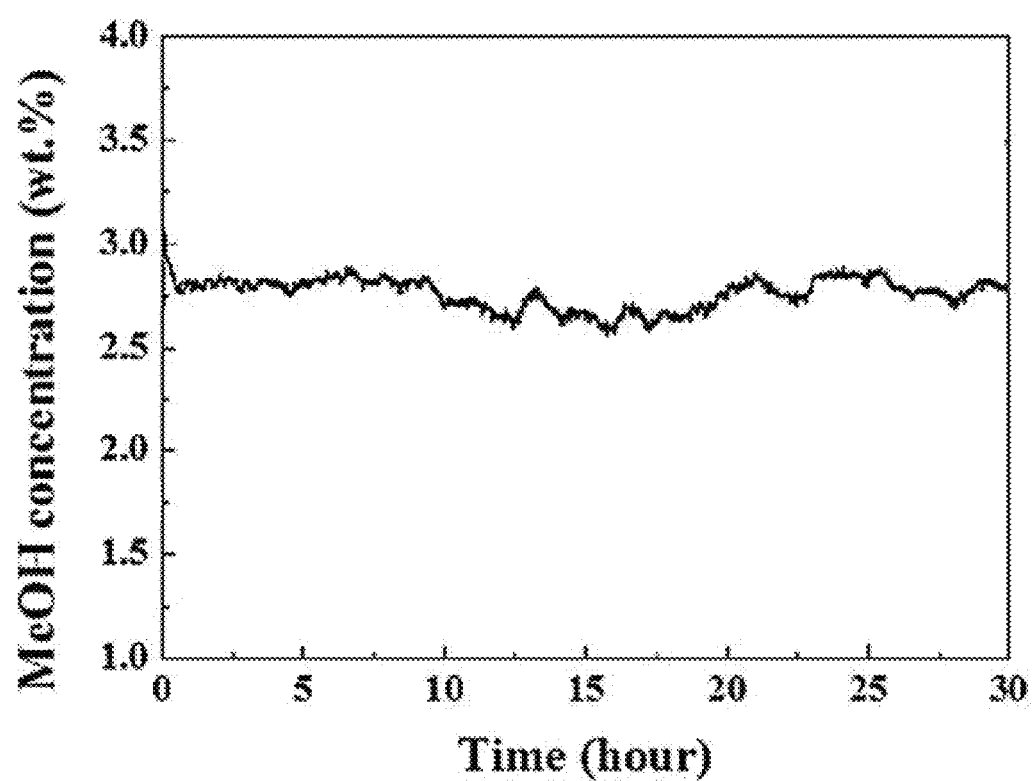
Figure 11D:
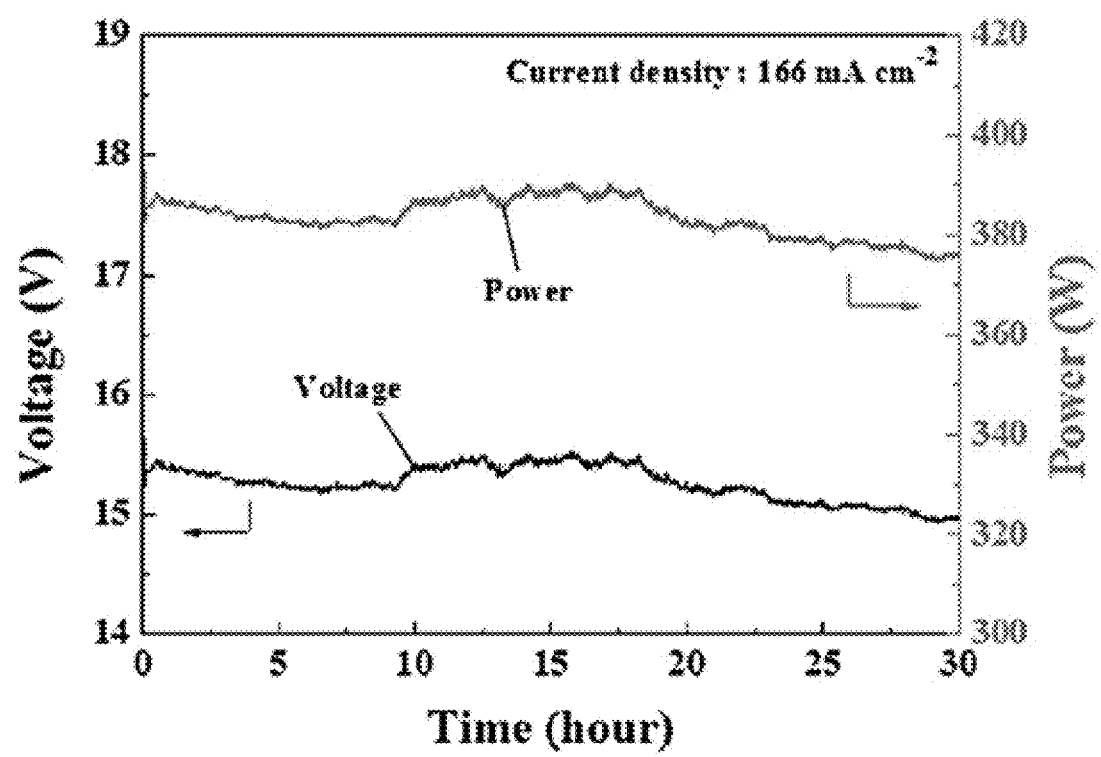

After that, when the external temperature of the fuel cell system varies as shown in FIG. 11A, variations of temperature of each component of the fuel cell system, a concentration of the methanol fuel injected to the fuel cell stack and output voltage and power of the fuel cell stack were measured, as shown in FIGS. 11B to 11D.

Figure 12:
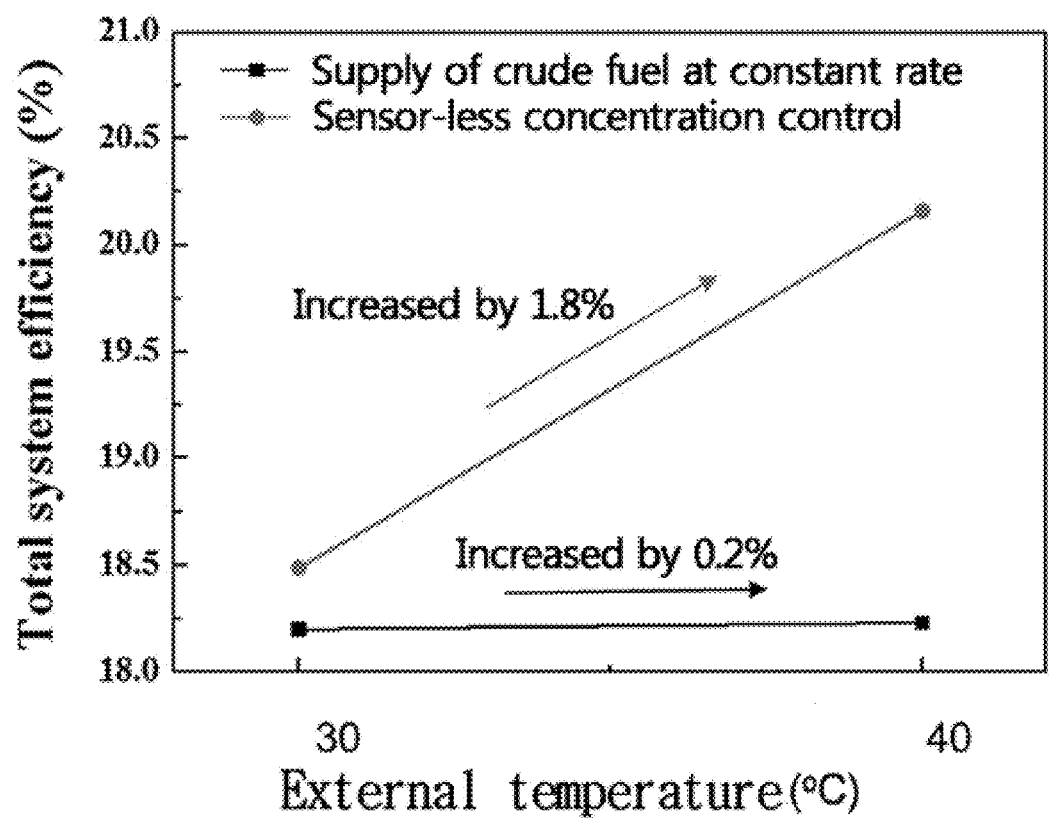
FIG. 12 is a graph for comparing efficiency of entire fuel cell systems prepared according to an embodiment of the present disclosure and a comparative example.

After that, efficiencies of the entire fuel cell systems prepared according to Example 4 and Comparative Example 2 were compared, as depicted in FIG. 12.

Referring to FIG. 12, in the comparative example where a constant amount of crude methanol fuel is simply supplied, it can be found that the efficiency of the entire system increases by 0.2% after external temperature rises, in comparison to the case before the external temperature rises. Meanwhile, in the comparative example where the sensorless concentration control is performed, it can be found that the efficiency of the entire system increases by 1.8% in comparison to the case before the external temperature rises. Through this, it can be understood that the method for controlling a concentration of a methanol diluted fuel by using the sensor-less concentration controller is more efficient under an operation environment where external temperature varies.

REFERENCE SYMBOLS

| | |
|---|---|
| 1: fuel mixer | 2: diluted fuel supply pump |
| 3: fuel cell stack | 4: air blower |
| 5: crude fuel tank | 6: crude fuel supply pump |
| 7: water storage | 8: water supply pump |
| 9: concentration controller using a concentration sensor | |
| 10: liquid level measuring device | 11: anode heat exchanger |
| 12: cathode heat exchanger | 13: carbon dioxide gas exhauster |
| 14: temperature measuring device | |
| 15: voltage measurement and output current control apparatus | |
| 16: sensor pump | 17: methanol concentration sensor |
| 18: apparatus for controlling a fuel concentration of a liquid fuel cell without using a concentration sensor | |

What is claimed is:

1. An apparatus for controlling a fuel concentration of a liquid fuel cell by sensor-free voltage amplitude control-based feed-back control, which is connected to a measuring device for measuring an output current and an output voltage of the liquid fuel cell and a temperature and a pressure in a fuel cell stack, the apparatus comprising:
a first processing unit programmed to measure an output voltage amplitude (Vamp) and a stack temperature (T) according to an operating condition of the liquid fuel cell and build a database of the voltage amplitude (Vamp) and a consumption rate of a diluted fuel under the operating condition;
a second processing unit programmed to set a target voltage amplitude (Vst-amp) and a target stack temperature (Tst) based on a correlation between the consumption rate of the diluted fuel and the voltage amplitude (Vamp); and
a third processing unit programmed to measure a voltage amplitude (Vamp) and a temperature (T) of the fuel cell stack at a voltage amplitude measurement period (tst), compare the voltage amplitude (Vamp) and the temperature (T) of the fuel cell stack respectively with the target voltage amplitude (Vst-amp) and the target stack temperature (Tst) to calculate an error, determine a signal of a supply rate (Pfuel) of a crude fuel according to a feed-back control so that the measured voltage amplitude (Vamp) reaches the target voltage amplitude (Vst-amp), and send the signal to a fuel supply unit.

2. The apparatus for controlling a fuel concentration of a liquid fuel cell by sensor-free voltage amplitude control-based feed-back control according to claim 1,
wherein the actual operating condition further includes an output current (Ist).

3. The apparatus for controlling a fuel concentration of a liquid fuel cell by sensor-free voltage amplitude control-based feed-back control according to claim 1,
wherein the third processing unit programmed to start operating when the liquid fuel cell reaches a target operating condition after passing a start-up period or enters a normal state after reaching the target operating condition, and when the third processing unit starts operating, a crude fuel supply rate (Pfuel) at an initial stage is identical to a crude fuel supply rate (Pfuel) at a final stage of the start-up period.

4. The apparatus for controlling a fuel concentration of a liquid fuel cell by sensor-free voltage amplitude control-based feed-back control according to claim 3,
wherein the crude fuel supply rate (Pfuel) is determined by multiplying a value calculated by using an output current (Ist) according to the operation of the liquid fuel cell and a Faraday constant by a predetermined number, and the number is determined by using any one of P, PI and PID solely or using P, PI and PID alternately.

5. The apparatus for controlling a fuel concentration of a liquid fuel cell by sensor-free voltage amplitude control-based feed-back control according to claim 1,
wherein the voltage amplitude (Vamp) is calculated from a difference between a maximum voltage (Vmax) and a minimum voltage (Vmin) measured during the voltage amplitude measurement period (tst), or calculated by a difference between average values of first and second groups, which are classified so that the first group includes values greater than an average value of all voltage values in the voltage amplitude measurement period (tst) and the second group includes value smaller than the average value of the all voltage values,
wherein the voltage amplitude measurement period (tst) is 1 to 30 seconds, and
wherein when the measured voltage amplitude (Vamp) is greater than the target voltage amplitude (Vst-amp), the supply rate (Pfuel) of the crude fuel is decreased, and when the measured voltage amplitude (Vamp) is smaller than the target voltage amplitude (Vst-amp), the supply rate (Pfuel) of the crude fuel is increased.

6. The apparatus for controlling a fuel concentration of a liquid fuel cell by sensor-free voltage amplitude control-based feed-back control according claim 1,
wherein in the third processing unit, the process of controlling the supply rate (Pfuel) of the crude fuel based on the voltage amplitude (Vamp) is performed by a feed-back controller based on the voltage amplitude (Vamp), and wherein the feed-back controller is implemented by using any one of P, PI and PID solely or using P, PI and PID alternately.

7. The apparatus for controlling a fuel concentration of a liquid fuel cell by sensor-free voltage amplitude control-based feed-back control according to claim 1, wherein the apparatus for controlling a fuel concentration by sensor-free control comprises an auto-tuning unit programmed to vary a target voltage amplitude (Vst-amp) according to an operation temperature (T) of the fuel cell stack, wherein in the voltage amplitude measurement period (tst), the operation temperature (T) of the fuel cell stack is measured and compared respectively with the target voltage amplitude (Vst-amp) and the target stack temperature (Tst) to calculate an error, wherein when the operation temperature (T) of the fuel cell stack is higher than a maximum temperature (Tmax) of an error range of the target operation temperature (Tst), the target voltage amplitude (Vst-amp) is lowered, wherein when the operation temperature (T) of the fuel cell stack is lower than a minimum temperature (Tmin) of the error range of the target operation temperature (Tst), the target voltage amplitude (Vst-amp) is raised, and wherein a ratio of varying the target voltage amplitude (Vst-amp) is 1 to 30% of the voltage amplitude (Vst-amp).

8. The apparatus for controlling a fuel concentration of a liquid fuel cell by sensor-free voltage amplitude control-based feed-back control according to claim 1, wherein a maximum temperature (Tmax) and a minimum temperature (Tmin) of the fuel cell stack are respectively calculated according to Equation 1 below, and an allowable error range (eT) of the stack temperature is 0.01 to 0.05:

$Tmax = Tst*(1+eT)$ $Tmin = Tst*(1-eT)$   Equation 1 where Tmax represents a maximum value of the stack temperature, Tst represents a target temperature of the fuel cell stack, eT represents an allowable error range of the stack temperature, and Tmin represents a minimum value of the stack temperature.

9. The apparatus for controlling a fuel concentration of a liquid fuel cell by sensor-free voltage amplitude control-based feed-back control according to claim 7, wherein the auto-tuning unit is operated as a substitution for operating the first processing unit.

10. The apparatus for controlling a fuel concentration of a liquid fuel cell by sensor-free voltage amplitude control-based feed-back control according to claim 1, wherein a voltage amplitude (Vamp) measured for the first time when the liquid fuel cell reaches a target operating condition after passing a start-up period or enters a normal state after reaching the target operating condition is used as the target voltage amplitude (Vst-amp), as a substitution for operating the first processing unit.

11. The apparatus for controlling a fuel concentration of a liquid fuel cell by sensor-free voltage amplitude control-based feed-back control according to claim 1, wherein when the fuel cell is operated, the operation of the fuel cell is stopped in case an average output voltage of unit cells of the fuel cell stack is lower than 0.1 to 0.2V, in case any one of the unit cells has a voltage (Vi) equal to or lower than 0.0 to 0.1V, or in case any one of the unit cells has an operation temperature (T) higher than 90 to 100° C.

12. A liquid fuel cell apparatus, comprising:

a fuel cell stack;

a heat exchange unit connected to the fuel cell stack;

a fuel supply unit programmed to supply a diluted fuel to the fuel cell stack;

a temperature measuring device of the fuel cell stack;

an output measuring device programmed to measure at least one of output voltage and current of the fuel cell stack; and the control apparatus defined in claim 1, wherein the heat exchange unit includes a heat exchanger connected to the fuel cell stack and a heat removal degree control part configured to control a heat removal degree of the heat exchanger, wherein the fuel supply unit includes a fuel mixer configured to supply a diluted fuel to the fuel cell stack and a crude fuel supply part configured to supply a crude fuel to the fuel mixer, and wherein the control apparatus is connected to the temperature measuring device, the heat removal degree control part, the crude fuel supply part and the output measuring device.

13. The liquid fuel cell apparatus according to claim 12, wherein the fuel supply unit includes a fuel mixer; a crude fuel tank connected to the fuel mixer; and a pump serving as the crude fuel supply part for supplying a crude fuel from the crude fuel tank to the fuel mixer, the control apparatus being connected to the pump, and wherein the heat exchange unit includes an anode heat exchanger connected to an anode outlet of the fuel cell stack to receive a non-reacted mixture solution and supply a mixture solution with a lowered temperature by heat exchange to the fuel mixer; a cathode heat exchanger connected to a cathode outlet of the fuel cell stack to receive a humidified mixture gas and supply water condensed by heat exchange to a water storage; and a blower serving as the heat removal degree control part connected to the heat exchanger, the control apparatus being connected to the blower.

14. The liquid fuel cell apparatus according to claim 12, wherein a liquid fuel used in the liquid fuel cell is any one reactant selected from the group consisting of methanol, ethanol, formic acid, isopropanol, propanol, ethylene glycol, dimethyl ether, butanol, hydrogen, butane, ethane, propane, boron compounds or boron hydrides, carbon dioxide, water, bio materials, and their mixtures.

* * * * *